(12) United States Patent
Ninan et al.

(10) Patent No.: US 9,464,769 B2
(45) Date of Patent: Oct. 11, 2016

(54) TECHNIQUES FOR USING QUANTUM DOTS TO REGENERATE LIGHT IN DISPLAY SYSTEMS

(75) Inventors: Ajit Ninan, San Jose, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 195 days.

(21) Appl. No.: 13/325,284

(22) Filed: Dec. 14, 2011

(65) Prior Publication Data

US 2012/0154464 A1 Jun. 21, 2012

Related U.S. Application Data

(60) Provisional application No. 61/424,199, filed on Dec. 17, 2010, provisional application No. 61/448,599, filed on Mar. 2, 2011, provisional application No. 61/486,160, filed on May 13, 2011, provisional application No. 61/486,166, filed on May 13, 2011, provisional application No. 61/486,171, filed on May 13, 2011.

(51) Int. Cl.
*F21K 99/00* (2016.01)
*G02B 27/22* (2006.01)
(Continued)

(52) U.S. Cl.
CPC . *F21K 9/56* (2013.01); *F21V 9/08* (2013.01); *G02B 26/08* (2013.01); *G02B 27/2207* (2013.01); *G02B 27/2264* (2013.01); *G09G 3/001* (2013.01); *G09G 3/003* (2013.01);
(Continued)

(58) Field of Classification Search
CPC .......... G02B 2027/0178; G02B 26/08; G02B 27/2207; G02B 27/2264; F21V 9/08; G09G 2310/0235; G09G 3/001; G09G 3/003; G09G 3/02; G09G 3/025; G09G 5/14
USPC ............................. 345/87–102, 204; 257/13
See application file for complete search history.

(56) References Cited

U.S. PATENT DOCUMENTS

| | | |
|---|---|---|
| 5,138,441 A | 8/1992 | Tanaka |
| 5,754,159 A | 5/1998 | Wood |

(Continued)

FOREIGN PATENT DOCUMENTS

| | | |
|---|---|---|
| CN | 1732717 | 2/2006 |
| CN | 1841471 | 10/2006 |

(Continued)

OTHER PUBLICATIONS

Wayback machine archive of wiki page on Quantum Dot, dated on Jan. 18, 2010, attached here as "wiki_quantum dot.pdf", also available at url: https://web.archive.org/web/20100118031057/http://en.wikipedia.org/wiki/Quantum_dot#Light_emitting_devices.*

(Continued)

*Primary Examiner* — Grant Sitta

(57) ABSTRACT

Techniques for configuring light conversion materials such as quantum dots in a display system are described. A display system includes light source components that emit a first light. The display system further includes a light converter illuminated by the first light. The light converter converts the first light into second light comprising one or more color components to support a specific color gamut. The second light forms, based at least in part on image data for images to be rendered, an emission pattern that varies with space and time.

20 Claims, 20 Drawing Sheets

(51) Int. Cl.
  *G09G 3/00* (2006.01)
  *G09G 3/02* (2006.01)
  *G09G 5/14* (2006.01)
  *F21V 9/08* (2006.01)
  *G02B 26/08* (2006.01)
(52) U.S. Cl.
  CPC ............ *G09G3/02* (2013.01); *G09G 3/025* (2013.01); *G09G 5/14* (2013.01); *G09G 2310/0235* (2013.01)

(56) References Cited

U.S. PATENT DOCUMENTS

| | | | |
|---|---|---|---|
| 5,774,257 | A | 6/1998 | Shibata |
| 5,920,361 | A | 7/1999 | Gibeau |
| 6,031,328 | A | 2/2000 | Nakamoto |
| 6,470,115 | B1 | 10/2002 | Yonekubo |
| 6,608,439 | B1 | 8/2003 | Sokolik |
| 6,864,626 | B1 | 3/2005 | Weiss |
| 7,126,254 | B2 | 10/2006 | Nanataki |
| 7,230,603 | B2 | 6/2007 | Yamamoto |
| 7,420,323 | B2 | 9/2008 | Krummacher |
| 7,430,022 | B2 | 9/2008 | Hekstra |
| 7,465,104 | B2 | 12/2008 | Tokui |
| 7,481,562 | B2 | 1/2009 | Chua |
| 7,486,854 | B2 | 2/2009 | Van Ostrand |
| 7,498,534 | B2 | 3/2009 | Hoyle |
| 7,537,947 | B2 | 5/2009 | Smith |
| 7,649,594 | B2 | 1/2010 | Kim |
| 7,686,493 | B2 | 3/2010 | Roshan |
| 7,696,684 | B2 | 4/2010 | Weiss |
| 7,733,017 | B2 | 6/2010 | Shapiro |
| 7,746,423 | B2 | 6/2010 | Im |
| 7,751,663 | B2 | 7/2010 | Van Ostrand |
| 7,768,023 | B2 | 8/2010 | Diana |
| 7,858,409 | B2 | 12/2010 | Kessels |
| 7,982,812 | B2 | 7/2011 | Rho |
| 7,988,311 | B2 | 8/2011 | Helbing |
| 8,026,661 | B2 | 9/2011 | Weiss |
| 8,035,772 | B2 | 10/2011 | Kim |
| 8,075,148 | B2 | 12/2011 | Nada |
| 8,164,820 | B2 | 4/2012 | Cho |
| 8,210,701 | B2 | 7/2012 | Igarashi |
| 8,215,815 | B2 | 7/2012 | Meir |
| 8,242,679 | B2 | 8/2012 | Noh |
| 8,294,168 | B2 | 10/2012 | Park |
| 8,344,404 | B2 * | 1/2013 | Fujita ............ C03C 3/19 257/79 |
| 8,773,453 | B2 | 7/2014 | Ninan |
| 2001/0008395 | A1 * | 7/2001 | Yamamoto ......... G09G 3/3406 345/102 |
| 2003/0117546 | A1 | 6/2003 | Conner |
| 2004/0061708 | A1 * | 4/2004 | Oh ............... 345/690 |
| 2005/0093813 | A1 | 5/2005 | Yamamoto et al. |
| 2005/0269950 | A1 | 12/2005 | Giraldo |
| 2006/0056197 | A1 | 3/2006 | Robinson |
| 2006/0103589 | A1 * | 5/2006 | Chua et al. .......... 345/3.1 |
| 2006/0109682 | A1 | 5/2006 | Ko |
| 2006/0121371 | A1 | 6/2006 | Wu |
| 2006/0221012 | A1 | 10/2006 | Ikeda |
| 2006/0221021 | A1 | 10/2006 | Hajjar |
| 2006/0221022 | A1 | 10/2006 | Hajjar |
| 2006/0238103 | A1 | 10/2006 | Choi |
| 2006/0244367 | A1 | 11/2006 | Im |
| 2007/0008458 | A1 | 1/2007 | Tokui et al. |
| 2007/0029560 | A1 | 2/2007 | Su |
| 2007/0096141 | A1 | 5/2007 | Chen |
| 2007/0247573 | A1 | 10/2007 | Ouderkirk |
| 2007/0268240 | A1 | 11/2007 | Lee |
| 2008/0007172 | A1 | 1/2008 | Tan |
| 2008/0049164 | A1 * | 2/2008 | Jeon ............. G02F 1/133603 349/61 |
| 2008/0136758 | A1 | 6/2008 | Ohta |
| 2008/0172197 | A1 | 7/2008 | Skipor |
| 2008/0215279 | A1 | 9/2008 | Salsbury |
| 2008/0225520 | A1 | 9/2008 | Garbus |
| 2009/0034292 | A1 | 2/2009 | Pokrovskiy |
| 2009/0039448 | A1 | 2/2009 | Chuang |
| 2009/0059554 | A1 | 3/2009 | Skipor |
| 2009/0091689 | A1 | 4/2009 | Rho |
| 2009/0109517 | A1 | 4/2009 | Cho |
| 2009/0162011 | A1 | 6/2009 | Coe-Sullivan |
| 2009/0180055 | A1 | 7/2009 | Kim |
| 2009/0190095 | A1 | 7/2009 | Ellinger |
| 2009/0194774 | A1 | 8/2009 | Huang |
| 2009/0196014 | A1 | 8/2009 | Hsiao |
| 2009/0213294 | A1 | 8/2009 | Jung |
| 2009/0231831 | A1 | 9/2009 | Hsiao |
| 2010/0079704 | A1 * | 4/2010 | Cho et al. ............ 349/71 |
| 2010/0084674 | A1 | 4/2010 | Paetzold |
| 2010/0102251 | A1 | 4/2010 | Ferrini |
| 2010/0102340 | A1 | 4/2010 | Ooya |
| 2010/0117997 | A1 | 5/2010 | Haase |
| 2010/0123155 | A1 | 5/2010 | Pickett |
| 2010/0123839 | A1 | 5/2010 | Lu |
| 2010/0155749 | A1 | 6/2010 | Chen |
| 2010/0172138 | A1 | 7/2010 | Richardson |
| 2010/0177091 | A1 | 7/2010 | Hioki |
| 2010/0193806 | A1 | 8/2010 | Byun |
| 2010/0207865 | A1 | 8/2010 | Auld |
| 2010/0208172 | A1 | 8/2010 | Jang |
| 2010/0208493 | A1 | 8/2010 | Choi |
| 2010/0214282 | A1 | 8/2010 | Whitehead |
| 2010/0246160 | A1 | 9/2010 | Ito |
| 2010/0283036 | A1 | 11/2010 | Coe-Sullivan |
| 2010/0283072 | A1 | 11/2010 | Kazlas |
| 2010/0289819 | A1 | 11/2010 | Singh |
| 2011/0068354 | A1 * | 3/2011 | Tran ............... F21K 9/00 257/89 |
| 2011/0089809 | A1 | 4/2011 | Noh |
| 2011/0133654 | A1 * | 6/2011 | McKenzie ......... F21K 9/00 315/152 |
| 2011/0205251 | A1 | 8/2011 | Auld |
| 2011/0299011 | A1 | 12/2011 | Weiss |
| 2011/0309325 | A1 * | 12/2011 | Park ............. H01L 25/0753 257/13 |
| 2011/0312116 | A1 | 12/2011 | Weiss |
| 2011/0317097 | A1 | 12/2011 | Kim |
| 2012/0050632 | A1 | 3/2012 | Shih |
| 2012/0154417 | A1 | 6/2012 | Ninan |
| 2012/0154422 | A1 | 6/2012 | Ninan |
| 2012/0274882 | A1 | 11/2012 | Jung |
| 2012/0287381 | A1 | 11/2012 | Li |
| 2013/0050293 | A1 | 2/2013 | Feng |
| 2013/0201661 | A1 | 8/2013 | Mehrle |
| 2013/0208508 | A1 | 8/2013 | Nichol et al. |
| 2013/0215136 | A1 | 8/2013 | Jiao |
| 2013/0335677 | A1 | 12/2013 | You |
| 2013/0342558 | A1 | 12/2013 | Sasaki |

FOREIGN PATENT DOCUMENTS

| | | |
|---|---|---|
| CN | 1854857 | 11/2006 |
| CN | 201062757 | 5/2008 |
| CN | 101218621 | 7/2008 |
| CN | 101243557 | 8/2008 |
| CN | 101322247 | 12/2008 |
| CN | 101512697 | 8/2009 |
| EP | 1579733 | 9/2005 |
| EP | 1922763 | 5/2008 |
| EP | 2365384 | 9/2011 |
| JP | 2-78393 | 3/1990 |
| JP | 2004-325647 | 11/2004 |
| JP | 2005-258248 | 9/2005 |
| JP | 2008-538145 | 10/2008 |
| JP | 2009-251129 | 10/2009 |
| KR | 10-2005-0021548 | 3/2005 |
| KR | 10-2005-0046816 | 5/2005 |
| KR | 2008-0041780 | 5/2008 |
| KR | 10-2010-0039910 | 4/2010 |
| KR | 2008-0012246 | 2/2011 |
| KR | 2011-0012246 | 2/2011 |
| KR | 2011-0072210 | 6/2011 |
| KR | 2012-0078883 | 7/2012 |

(56) References Cited

FOREIGN PATENT DOCUMENTS

| KR | 2013-0000506 | 1/2013 |
|---|---|---|
| WO | 00/17903 | 3/2000 |
| WO | 03/058726 | 7/2003 |
| WO | 2004/060024 | 7/2004 |
| WO | WO2006/046168 | 5/2006 |
| WO | 2006/107720 | 10/2006 |
| WO | WO2006/107720 | 10/2006 |
| WO | 2007/020556 | 2/2007 |
| WO | 2007/114918 | 10/2007 |
| WO | 2009/041594 | 4/2009 |
| WO | 2009/078426 | 6/2009 |
| WO | 2010/058162 | 5/2010 |
| WO | 2011/031802 | 3/2011 |

OTHER PUBLICATIONS

NanocoTechnologies "The Future of Cadmium Free QD Display Technology" Apr. 2011.
Quantum Dot LCD HDTV, Dec. 31, 2009.
Nanosys and LG Close to Bringing Quantun Dot Technology to LCD Displays, Nov. 4, 2010.
Green, Kate, "How Quantum Dots Will Make LCDs Better", Dec. 9, 2009, QD Vision.
U.S. Appl. No. 14/304,123, Non-Final Office Action dated Oct. 8, 2015.

* cited by examiner

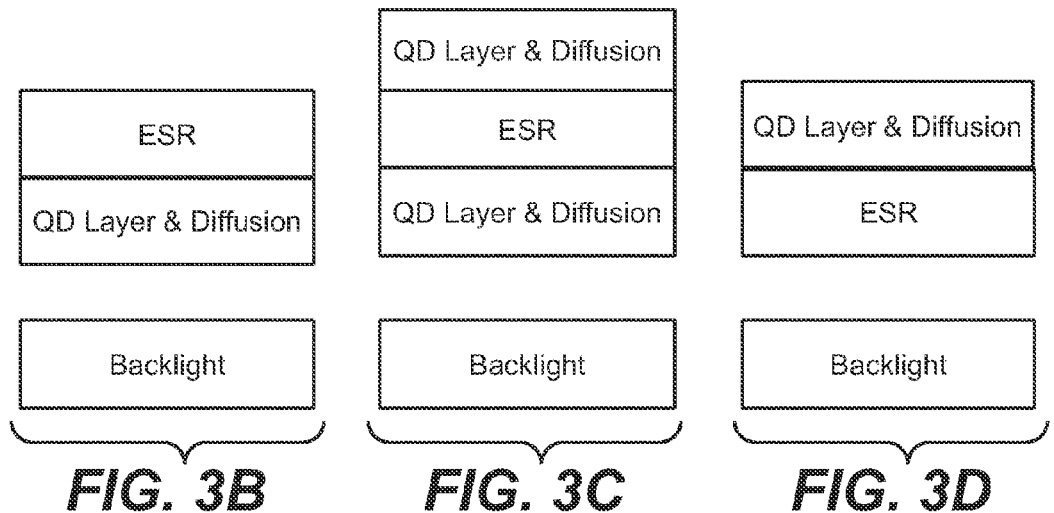
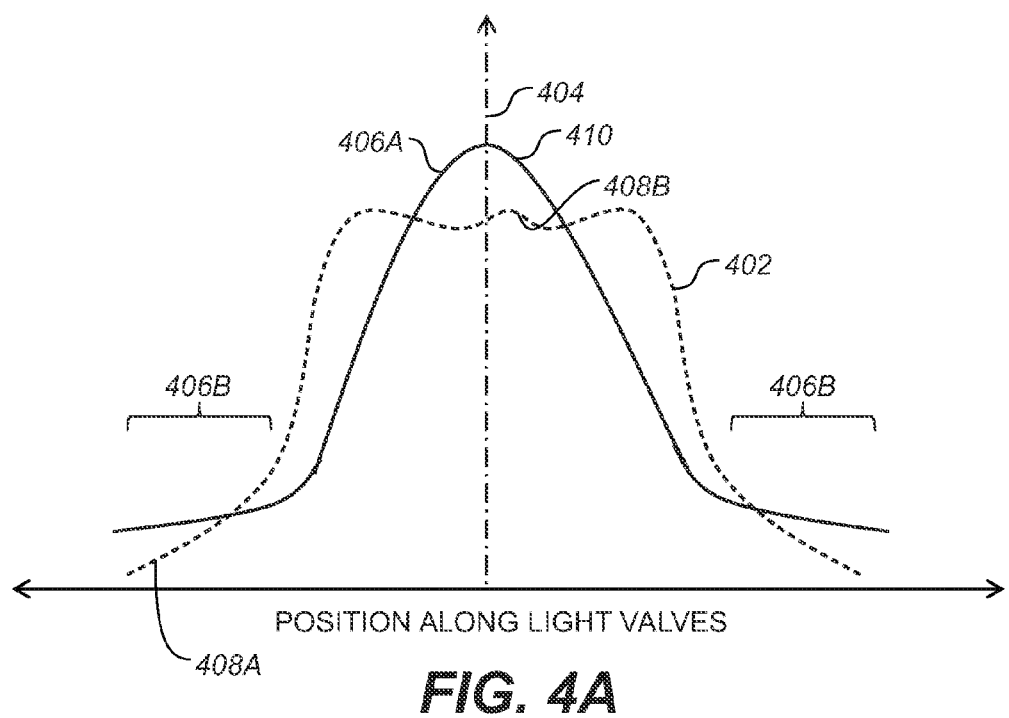

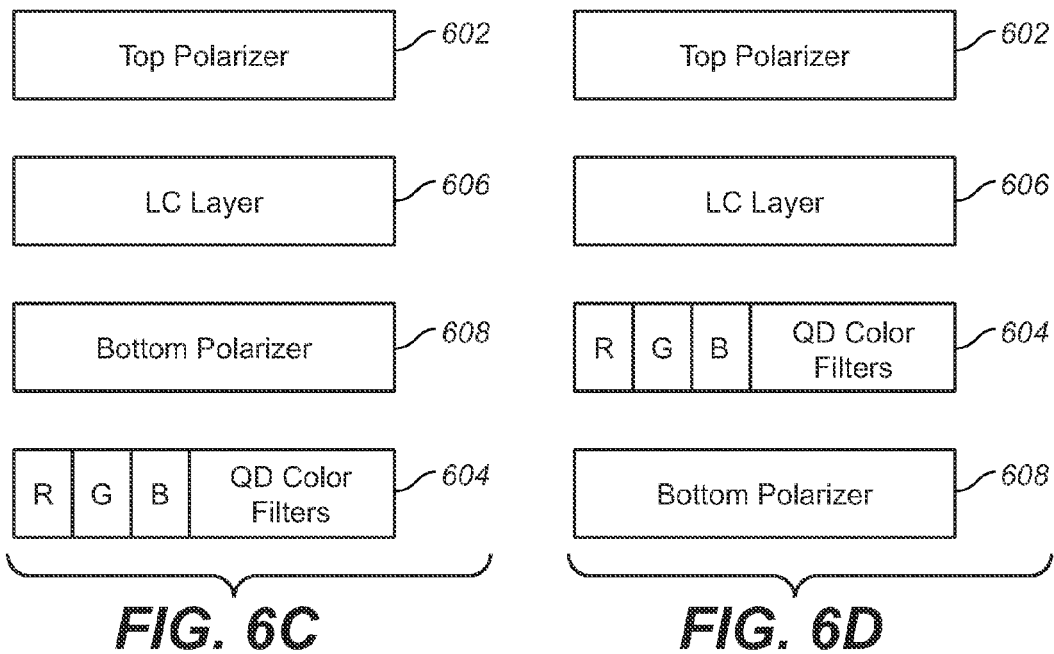
FIG. 6C
FIG. 6D
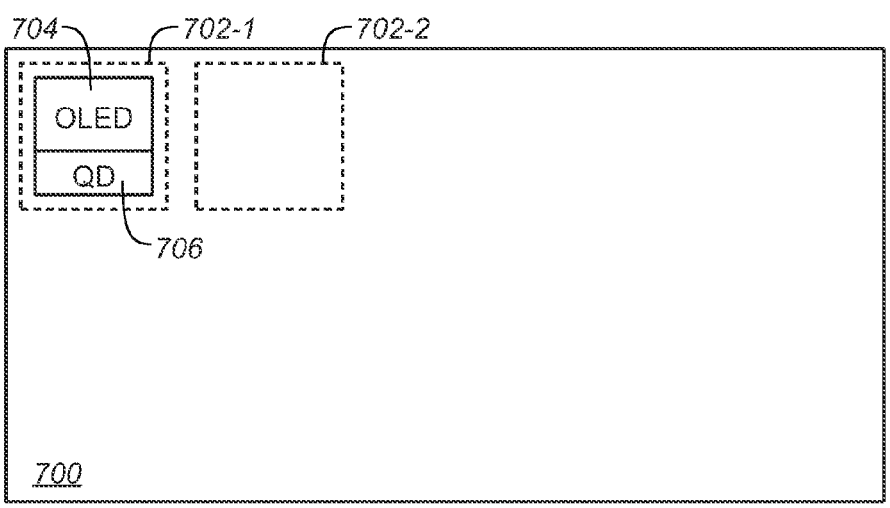
FIG. 7

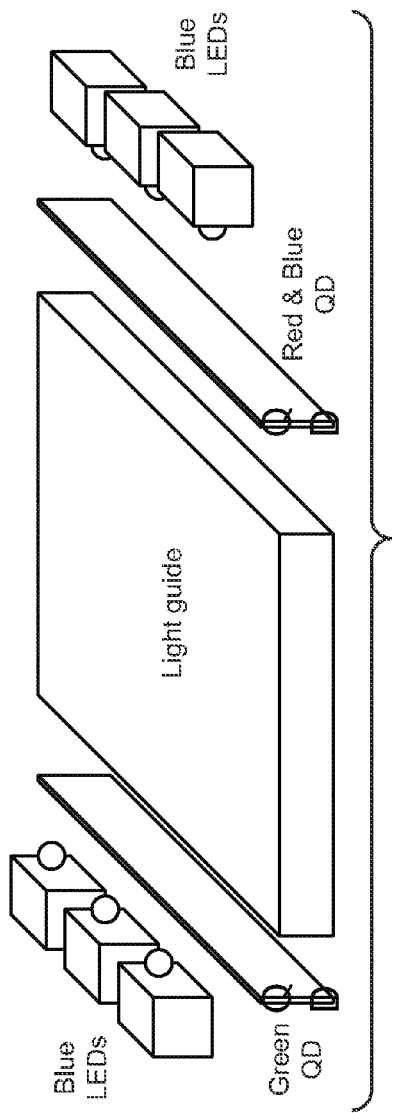
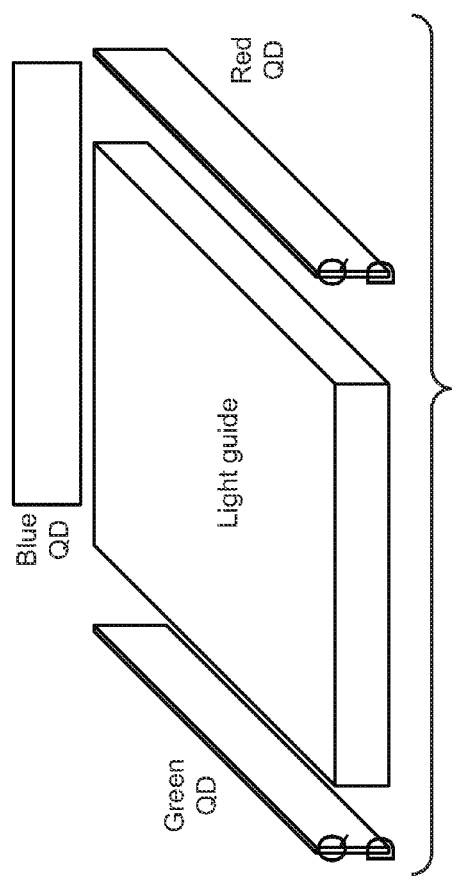
FIG. 13A
FIG. 13B

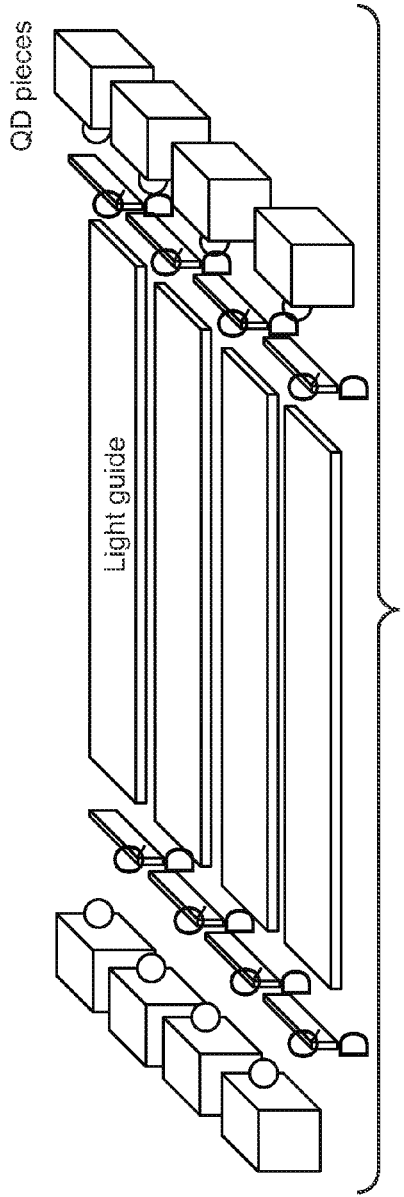
FIG. 19
FIG. 20B
FIG. 20A

TECHNIQUES FOR USING QUANTUM DOTS TO REGENERATE LIGHT IN DISPLAY SYSTEMS

CROSS-REFERENCE TO RELATED APPLICATIONS

This Application claims benefit of priority to related, U.S. Provisional Patent Application No. 61/424,199 filed on Dec. 17, 2010; U.S. Provisional Patent Application No. 61/448,599 filed on Mar. 2, 2011; U.S. Provisional Patent Application No. 61/486,160 filed on May 13, 2011; U.S. Provisional Patent Application No. 61/486,166 filed on May 13, 2011; and U.S. Provisional Patent Application No. 61/486,171 filed on May 13, 2011, which are hereby incorporated herein by reference for all purposes as if fully set forth herein.

This Application is related to U.S. Patent Application No. 61/241,681 filed on Sep. 11, 2009, and No. 61/287,117 filed on Dec. 16, 2009, which are hereby incorporated herein by reference for all purposes as if fully set forth herein.

TECHNOLOGY

The present invention relates generally to display systems, and in particular, to quantum dots in display systems.

BACKGROUND

To display images, a display system may contain light valves and color filters that regulate brightness levels and color values of pixels as the pixels are being illuminated by a light source, such as back light units (BLUs). Typically, light sources such as fluorescent lights or light-emitting diodes illuminate pixels on display panels. The light illuminating the pixels is attenuated by RGB color filters and liquid crystal materials.

Due to its inherent inefficient optical filtering, a color filter may block all but a very small percentage of the incident light. As much as ninety six percent of the incident light may be wasted.

Additionally, different types of LEDs emit light of most wavelengths for which display systems are not optimized, image inversions, restrictive viewing angles and undesirable color representations and tinges may occur in the display systems so that displayed images suffer from poor quality or limited color gamuts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A through FIG. 3D shows example light sources in display systems, in accordance with some possible embodiments of the invention;

FIG. 4A through FIG. 4C illustrate light distributions on light valve layers, in accordance with some possible embodiments of the invention;

FIG. 6A through FIG. 6D illustrate quantum dot color filters, in accordance with some possible embodiments of the invention;

FIG. 7 illustrates a display system 700 with OLEDs and quantum dots, in accordance with some possible embodiments of the invention;

FIG. 13A through FIG. 13F illustrate example side-lit quantum dot configurations, in accordance with some possible embodiments of the invention;

FIG. 19 illustrates an example configuration in which a light guide comprises multiple disjoint parts, in accordance with some possible embodiments of the invention; and FIG. 20A and FIG. 20B illustrate example 3D display operations.

DESCRIPTION OF EXAMPLE POSSIBLE EMBODIMENTS

Figure 1A:
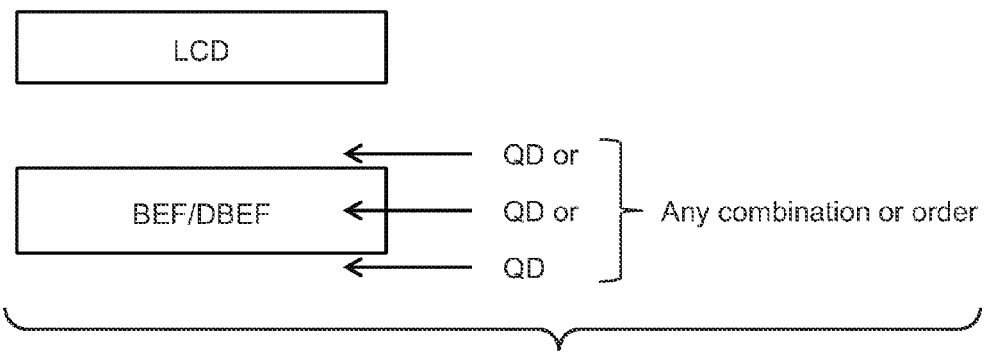
FIG. 1A through FIG. 1D illustrate example configurations of quantum dots in connection with one or more optical layers, in accordance with some possible embodiments of the present invention.

Example possible embodiments, which relate to quantum dots techniques, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. SYSTEM OVERVIEW
3. QUANTUM DOT CONFIGURATIONS
4. QUANTUM DOTS IN LEAKY REFLECTOR
5. QUANTUM DOT REFLECTORS
6. QUANTUM DOTS IN COLOR FILTERS AND OLED PIXELS
7. QUANTUM DOTS IN N MODULATION DISPLAY SYSTEMS
8. LIGHT SOURCE CONTROLLER
9. EXAMPLE PROCESS FLOW
10. IMPLEMENTATION MECHANISMS—HARDWARE OVERVIEW
11. EQUIVALENTS, EXTENSIONS, ALTERNATIVES AND MISCELLANEOUS

1. General Overview

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

Techniques are provided for using light conversion materials to improve display characteristics of a display system. The light conversion materials may be any materials that receive light irradiation from various types of light source components such as light emitting diodes, fluorescent lights, etc., and regenerates new light. For example, quantum dots may be used as light conversion materials as described herein and may be incorporated into any optical layers or components in the display system.

Optical layers doped or deposited with light conversion materials may include light guides, BEFs, DBEFs, thin or bulk diffusers, reflectors, contrast layers, mirrors, bumpy surfaces, etc. For example, quantum dots may be disposed with an optical layer in a variety of ways, including coating, embedding, placing films/sheets adjacent to the optical layer, etc. In some embodiments, quantum dots may be used with optical layers adjacent to an enhanced specular reflector to improve point spread functions of light emitters in a display system.

Light conversion materials may be distributed in an unmixed pattern or in a mixed form/state sharing a common spatial area. For example, the patterns formed by quantum dots may include linear patterns such as rows, columns, etc., and non-linear patterns such as triangular patterns, etc.

Light conversion materials may be used in place of, or in addition to, color-imparting dye materials in color filters. In some embodiments, quantum-dot-based color filters may be free of a top polarizer, or may be placed before or after a top polarizer. Instead of wasting a large percentage of light energy by filtering (e.g., white) light with (e.g., dye-based) passive color filters and/or polarizers under existing techniques, under techniques as described herein, light energy distributed in a broad range/spectrum of input light wavelength may be efficiently used to regenerate light of requisite primary colors to support image rendering in a color space.

Quantum-dot-based light sources and/or quantum-dot-based color filters may be used in a single display system comprising a stack of display panels. One or more of the display panels in the stack may be free of color filters or may be with color filters that are quantum dot based.

The benefits of using light conversion materials in a display system to impart colors and/or luminance include, but are not limited to, a high dynamic range of luminance levels, wide color gamuts that include a wide variety of colors, and accurate representation of colors that is supported by relative stable and precise composition of color components.

Light conversion materials such as quantum dots may be selected based on their physical properties (e.g., size, geometry, temperature expansion/contraction characteristics, etc., of quantum dots) including a property of emitting regenerated light with one or more color components to support a wide variety of color spaces. Temperature characteristics of a display system under techniques as described herein may be improved, as compared with other display systems that use other techniques. In particular, light conversion materials may be preconfigured to stay constant or relatively stable with operating temperatures of a light source, thereby allowing an accurate composition of colors across a wide range of operating temperatures.

Furthermore, absolute and/or relative intensities of color components in the regenerated light as described herein may be monitored and regulated. As a result, the regenerated light possesses an accurate profile of light wavelengths and intensities, even when light conversion materials age. A light source as described herein may be used in a high-end display system as a part of an optical stack, which may additionally and/or optionally comprise other optical components to set pixels at various color values and brightness levels. The accurate profile of light wavelengths and intensities in the regenerated light may result in illuminating pixels in the display system with white light at an accurate white point (e.g., D65 or another standard-based or non-standard-based white point) in a color gamut supported by the display system. Thus, images created by the display system may be highly accurate in terms of color values.

Under techniques as described herein, color components used to support a color space may not be limited to only three primary colors. One, two, three, four, five, six, or another positive number of primary colors may be configured and used in a display system as described herein. Some of the configured primary colors may be used to support bright saturated colors that are difficult to produce with a mixture of other primary colors. Thus, techniques as described herein may be used in part or together with other techniques to support a wide color gamut (WCG) in a high quality display system.

In some possible embodiments, a light source as described herein employs one or more pulse-width modulation (PWM) control signals such that the relative and/or absolute intensities of light of different colors may be controlled between a minimum intensity and a maximum intensity. Thus, a light source as described herein is configured to support not only a wide color gamut but also a highly dynamic range of contrast levels, allowing a display system to produce highly accurate and detailed images.

Light conversion materials as described herein may operate in place of, or alternatively, in addition to, other light sources (of a same or different type) in a single system (e.g., a single display system). For example, light conversion materials may be used to enhance colors and brightness levels for certain pixels based on local color concentrations or other chromatically related features of a given spatial area based on image data, while the pixels may be illuminated by another light source to express colors and brightness levels through, for example, LEDs and color filters. The quantum dots may also be used to compensate for incorrect and/or insufficient concentrations of color components in a display system. This can be used to produce a cost-effective lighting solution that corrects or compensates for color shifts, in a display system, that may vary with temperature and driver electric current. In some embodiments, quantum dots may be used with OLED to compensate for weak colors in a display system using OLED.

In some possible embodiments, mechanisms as described herein form a part of a display system, including but not limited to a handheld device, game machine, television, laptop computer, netbook computer, cellular radiotelephone, electronic book reader, point of sale terminal, desktop computer, computer workstation, computer kiosk, and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. System Overview

In some possible embodiments, a light source as described herein comprises one or more optical layers that may be stimulated or excited by incident first light to regenerate second light. The second light may be used to illuminate other parts of a display system including pixels in one or more light valve layers (e.g., one or more LCD panels).

In some possible embodiments, the optical layers may comprise quantum dots selected based on their physical properties including a property of emitting second light with one or more (e.g., a set number of) color components. Each of the one or more color components is second light of a particular color. In some possible embodiments, the colors in the second light do not vary with operating temperatures of the light source, thereby allowing an accurate composition of light of different colors across a wide range of operating temperatures in the light source. In some embodiments, light intensities of color components in the second light as described herein may be monitored and regulated. As a result, the second light possesses an accurate profile of light wavelengths and intensities. A light source as described herein may be used in a display system as a part of one or more optical stacks, which may additionally and/or optionally comprise other optical components. The accurate profile of light wavelengths and intensities in the second light may result in illuminating pixels in the display system with white light at a particular white point (e.g., D65 as defined by the International Commission on Illumination (CIE)) in a color gamut supported by the display system. Thus, images created by the display system may be highly accurate in terms of color values.

While three primary color components may be sufficient in most display systems, a light source as described herein may, but is not limited to, provide more (or fewer) color components than three. In particular, under techniques as described herein, a light source may comprise more than three color components (e.g., including highly saturated or brightened colors that are difficult to produce by mixing certain color components such as red, green, and blue), and may support a wide color gamut (WCG) in the display system.

For the purpose of illustrations, an optical layer that comprises one or more light conversion materials such as quantum dots may be denoted as a light conversion layer (or light modulation layer). Light conversion materials such as quantum dots as described herein may be distributed in an unmixed pattern, or alternatively in a mixed manner.

Intensities of regenerated light from each area of a light modulation layer as described herein may be preconfigured, measured and regulated. For example, composition of quantum dots in a light conversion layer may be preconfigured. Intensities of color components emitted from a light source as described herein may be monitored/measured and/or regulated. Thus, a light source as described herein is configured to support not only a wide color gamut but also a highly dynamic range of contrast levels, helping a display system produce highly accurate and detailed images.

A light source as described herein may operate in place of, or alternatively in addition to, other light sources (of a same or different type) in a single system (e.g., a single display system). For example, quantum dots may also be used to compensate for incorrect concentrations of LEDs of particular emission color bands in a display system. This can be used to produce a cost-effective lighting solution that corrects or compensates for color shifts in RGB LEDs that by themselves may vary with temperature and driver electric current.

A light conversion layer as described herein may be of any physical shape such as a shape with planar surfaces or curved surface, a cubic shape, a cylindrical shape, a shape with regular or irregular contours, etc. The physical attributes, including amounts, types, sizes, shapes, etc., of quantum dots as described herein may be particularly chosen to regenerate second light with accurate colors. Components emitting first light as described herein may comprise light-emitting diodes (LEDs), cold cathode fluorescent lights (CCFLs). These light emitting components may generate one or more color components (e.g., RGB), blue light, ultraviolet light, etc.

As described herein, an optical stack and/or a light source may comprise one or more of diffusers, polarization layers, light-focusing layers (e.g., made of one or more light-redirecting optical prisms), reflective layers, substrate layers, thin films, retardation films, rubbing surfaces, light crystal layers, color and/or colorless filters, color enhancers, etc. In some possible embodiments, an optical stack may comprise one or more optical components that are configured to diffuse and redirect light. In some possible embodiments, an optical stack and/or a light source may comprise one or more optical components such as reflective layers, polarization layers, optical filters, etc., to prevent certain light (e.g., exciting light) from illuminating pixels in the display system and to allow other light (e.g., excited light) to illuminate the pixels. It should be noted that, in some possible embodiments, some or all of the foregoing components in an optical stack may be implemented as a part of a light source, or alternatively as a part of a larger system that includes a light source.

In various possible embodiments of the present invention, non-quantum-dot light source components such as LEDs, CCFL, etc., may comprise only a single type of light source components, only two types of light source components, or more types of light source components. Light used to excite light conversion materials may be visible or invisible light. In some possible embodiments, at least a part of light regenerated from one light conversion material may feedback to excite the same or different light conversion material. For example, part of blue light regenerated from a light conversion material may be guided into an optical layer to cause an increase of green or red light regenerated by light conversion materials, but a decrease of blue light.

In various possible embodiments, light conversion materials as used herein may be preconfigured to have different input sensitivities. For example, in some display systems, light conversion materials may be preconfigured to have a relatively wide input sensitivity, while in some other display systems, light conversion materials may be preconfigured to a relatively wide input sensitivity. Embodiments also include use of light conversion materials with multiple input sensitivities. As used herein, the term "input sensitivity" refers to a property of a light conversion material which measures the amount of excited light regenerated by the light conversion material in response to incident light as a function of the incident light's particular input wavelengths or wavelength ranges.

In some possible embodiments, light intensities of first light from different light source components, and/or different spatial locations/area may be controlled individually or together. For example, one LED may be set as in one of one or more "on" states (e.g., fully on, partially on at one of 2, 4, 8, 16, 32, 64, 128, 256 or more levels, etc.), while another LED may be set in an "off" state.

In some possible embodiments, a light conversion layer may comprise a mixture of quantum dots of different color components. As used herein, the term "a mixture of quantum dots" means that two, or more types of quantum dots as described herein may be mixed according to a configured ratio, for example, to provide a particular white point for a specific color gamut. In some possible embodiments, quantum dots of different color components (e.g., red, green, and blue) may be evenly mixed. In some possible embodiments, proportional amounts of photons in different color components may be emitted from a mixture of quantum dots of different color components. In some possible embodiments, disproportional amounts of photons in different color components may be emitted from a mixture of quantum dots of different color components. Quantum dots mixed in a light conversion layer may be of narrow, intermediate, wide input sensitivity, or a mixture of two or more of different input sensitivities.

A display system as described herein may use a light conversion layer comprising light conversion components that are replaceable after the display system is placed in use, for example, by an end customer. In some possible embodiments, a light conversion layer may additionally and/or optionally comprise polarization films, retardation films, light recycling films, prisms, mirrors, bumpy surfaces, impurities, dopants, materials of differing refractive indices, light valves, etc.

A display system as described herein may be configured to support a large variation of brightness levels in different regions of a display panel. Additionally and/or optionally, the display system may be configured to support a fine control of brightness levels within each of the regions, in order to show high-quality images that comprise many fine details. Additionally and/or optionally, the display system may be configured to support a fine control of brightness levels for each different color based on the color content of the images being rendered.

For example, if a particular region of pixels should display more of red color, one or more light source components that cause red color light (e.g., second light of red color) in the particular region may be turned on, while some or all of other light source components that cause non-red color light (e.g., second light of blue color) in the particular region may be turned off or set to a relatively weak intensity level. Thus, a display system with a light source as described herein may have a relatively wide color gamut (capable of expressing deeply saturated colors), is able to display relatively accurate colored images, and is able to support a high dynamic range of luminance levels and contrast.

In some possible embodiments, a display system with a light source as described herein is configured to support one or more of a plurality of wide color gamuts, which may be standard-based, and may be non-standard-based. In some possible embodiments, the display system may be configured to support a Digital Cinema Initiative (DCI) color space, an Academy Color Encoding Space (ACES) P3, P4, P5, or P6 color space, a color space specified in the International Telecommunication Union Radio Communication Sector (ITU-R) BT.709 Recommendation standard of the International Telecommunications Union (ITU), a color space in compliance with the Reference Input Medium Metric/Reference Output Medium Metric (RIMM/ROMM) standard, etc.

3. Quantum Dot Configurations

In some possible embodiments, one or more quantum dot layers (films, sheets, etc.) may be used in an optical configuration of a display system. A quantum dot layer may be formed by adding quantum dots to an (e.g., existing or new) optical layer. Quantum dots may be coated, attached to, or otherwise disposed on the top surface, the bottom surface, or both surfaces of the optical layer. Quantum dots may also be embedded within the optical layer. Quantum dots may be disposed with the optical layer in any combination or order of various disposition methods. In some possible embodiments, may be a brightness enhancement film (BEF) or double brightness enhancement film (EBEF), as illustrated in FIG. 1A, a contrast layer, a bulk diffuser layer, a thin diffuser layer, etc. As further illustrated in FIG. 1D, quantum dots may be in an optical stack or components therein in any order.

Figure 1B:
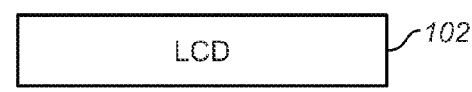
Figure 1C:
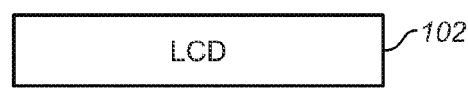
Figure 1D:
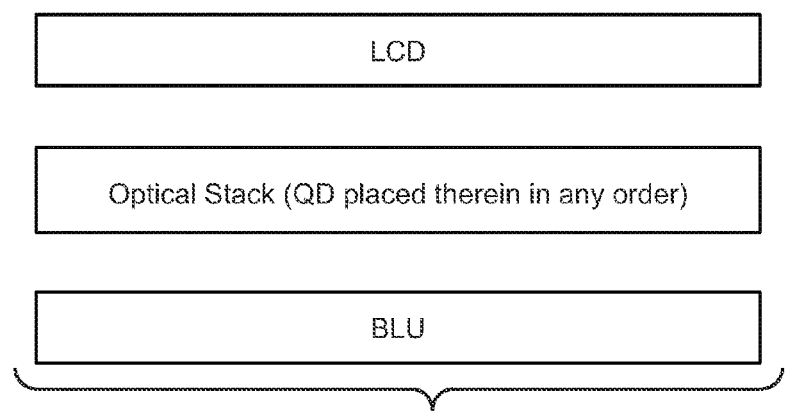

Quantum dots may be incorporated into any part of an optical configuration of a display system. Placement of a quantum dot layer (106) in an optical configuration of a display system may vary. As illustrated in FIG. 1B and FIG. 1C, the quantum dot layer may be between a back light unit (108) and a light modulation layer such as an LCD layer (102), either before or after another optical layer such as a BEF/DBEF layer (104). The quantum dot layer may also be placed below, above, or in between any optical layers in the optical configuration.

Figure 2A:
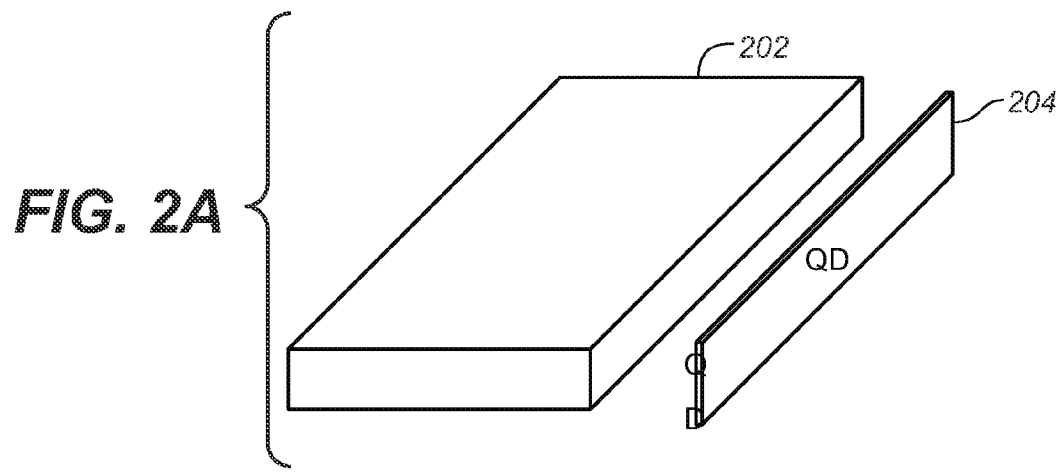
FIG. 2A through FIG. 2F illustrate example configurations of quantum dots with side light units, in accordance with some possible embodiments of the present invention.
Figure 2B:
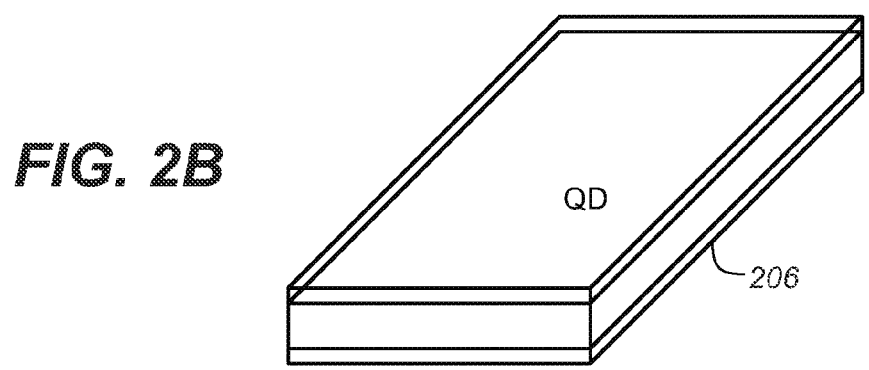

As illustrated in FIG. 2A, an optical waveguide 202 (or light guide) may be side lit by a quantum dot rail 204 (or sheet). Alternatively and/or additionally, a waveguide (e.g., 206) may comprise quantum dots coated, attached to, embedded in the interior of, or disposed in a top layer/surface, a bottom layer/surface, or both layers/surfaces of the waveguide, as shown in FIG. 2B. Alternatively and/or additionally, quantum dots may be embedded within the waveguide.

Figure 2C:
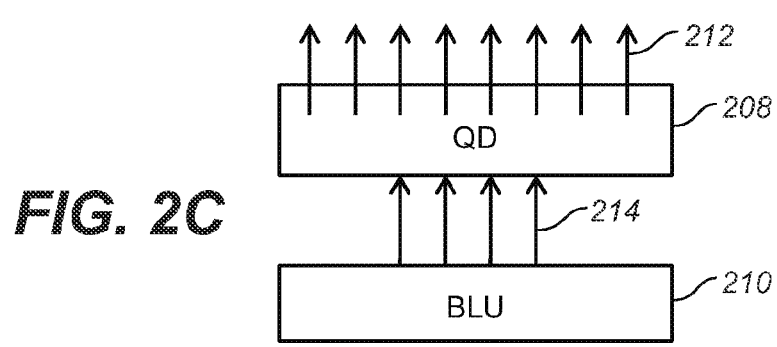
Figure 2D:
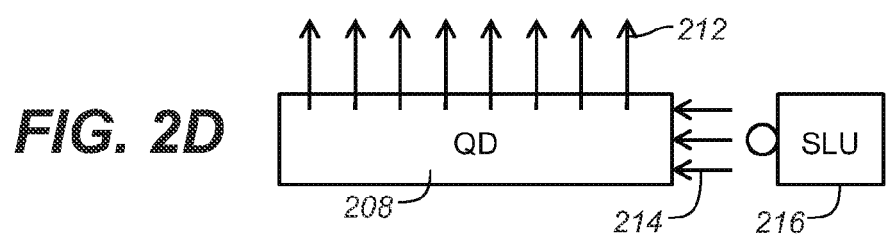

Quantum dots as described herein may be side lit or back lit. As illustrated in FIG. 2C, first light 214 emitted from a back light unit (BLU) 210 may illuminate quantum dots with an optical layer 208. As a result, regenerated light 212 may be emitted from the optical layer 208. Alternatively and/or additionally, the first light 214 may be emitted from a side light unit (SLU) 216, as illustrated in FIG. 2D.

Figure 2E:
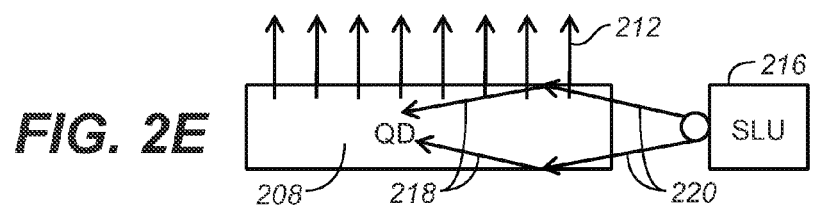

In some possible embodiments, as shown in FIG. 2E, one or more surfaces of an optical layer (e.g., 208) may be configured to totally reflect incident (e.g., first) light (e.g., 220) with oblique incident angles. Oblique incident angles may refer to incident angles less than a critical angle such that incident light below the critical angle is totally reflected (with reflected light 218) while incident light above the critical angle is partially reflected. The critical angle may be determined by the refractive indexes of physical matter on opposing sides of the reflecting surface. The optical layer may be configured with a material of a refractive index designed to trap all or nearly all the incident light from a light source (e.g., an SLU 216). In some possible embodiments, only regenerated light 212 from quantum dots in the optical layer 208 is allowed to escape from the optical layer, which may be a waveguide (or light guide).

Figure 2F:
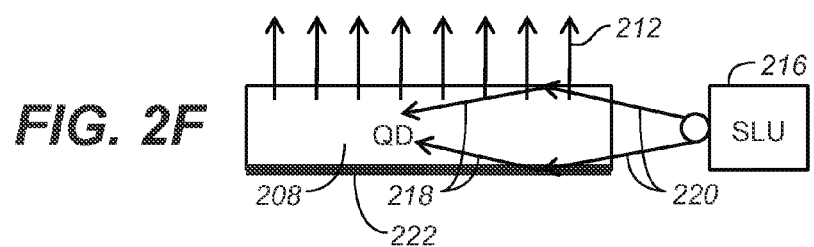

In some possible embodiments, as shown in FIG. 2F, a surface of an optical layer (e.g., 208) may be disposed with a mirror (e.g., 222) configured to totally reflect incident (e.g., first) light (e.g., 220) on the minor with any angles. The minor may be formed by a smooth surface, a bumpy surface, a structure designed to disperse light inside the optical layer (208), etc.

4. Quantum Dots in Leaky Reflector

Figure 3A:
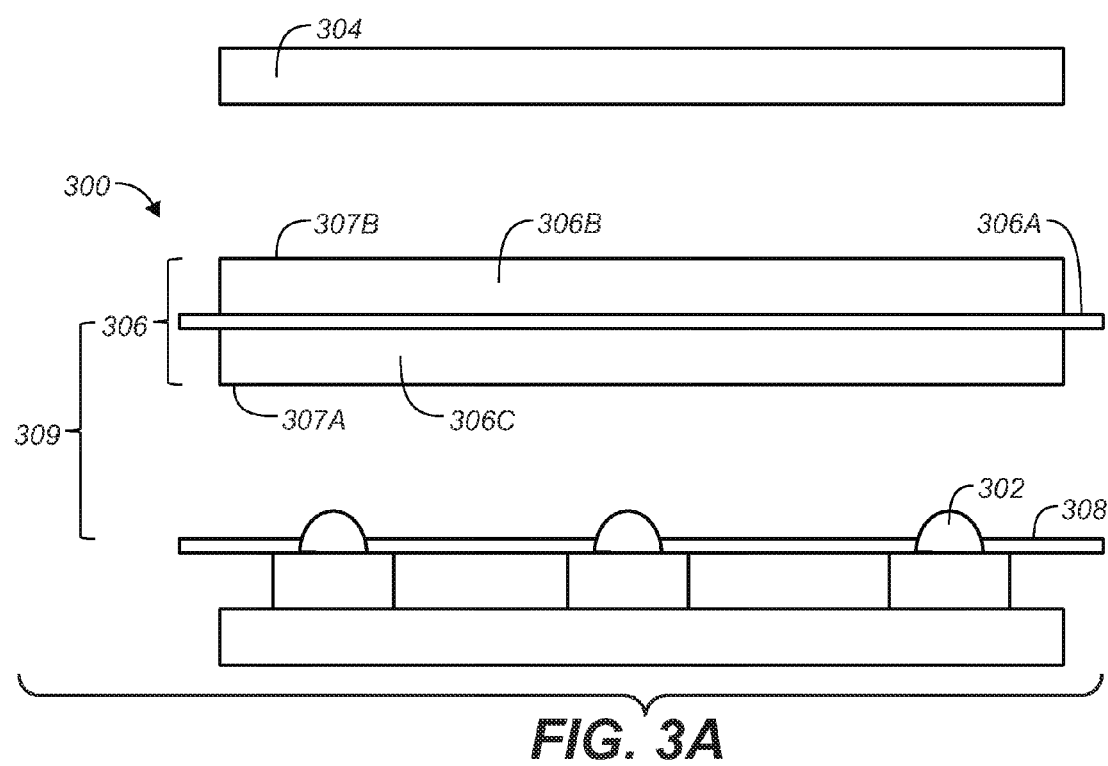

FIG. 3A shows a display system 300 according to an example embodiment. Display system 300 comprises light source components such as a backlight unit 302 and a light valve layer 304 (e.g., one or more LCD panels). Light valve layer 304 may comprise an array of pixels which are controllable to vary the amount of incident light that is transmitted by light valve layer 304. In some embodiments a pixel as described herein comprises individually controllable color sub-pixels.

A light control layer 306 is located between backlight unit 302 and light valve layer 304. Light from backlight unit 302 passes through light control layer 306 to reach light valve layer 304. Light control layer has a back side 307A facing toward backlight unit 302 and a front side 307B facing toward light valve layer 304.

Light control layer 306 comprises a layer 306A of an enhanced specular reflector (ESR). The ESR layer 306A may comprise a multilayer dielectric film that reflects and transmits light over substantially all visible wavelengths and at a wide range of angles of incidence with low absorption. ESR layer 306A may comprise a highly reflective ESR film that reflects a substantial proportion of visible light. ESR film is commercially available from 3M Electronic Display Lighting Optical Systems Division of St. Paul, Minn., USA under the brand name Vikuiti™. An ESR layer, if standing on its own in air, may be reflective over the entire visible spectrum regardless of the angle of incidence.

ESR layer 306A may be thin or thick. For example, an ESR film suitable for application in an embodiment as shown in FIG. 3A may have a thickness of 65 µm.

Light control layer 306 also comprises at least one layer of a transparent or translucent material having an index of refraction that is greater than that of air (e.g., greater than 1) and is in optical contact with ESR layer 306A. In the illustrated embodiment, light control layer comprises both a front layer 306B and a rear layer 306C. Other embodiments have only one of layers 306B and 306C. One or more of layers 306B and 306C may be diffusion layers.

Due to the presence of layers 306B and/or 306C, light control layer 306 has a reflectivity significantly lower than ESR layer 306A would have if standing on its own in air. Layers 306B and/or 306C act to reduce the reflectivity of ESR layer 306A. Layers 306B and/or 306C may comprise, for example, suitable plastics such as polycarbonates, Poly (methyl methacrylate) (e.g. Plexiglas™), acrylics, polyurethane, birefringent polyester, isotropic polyester and syndiotactic polystyrene.

Layers 306B and 306C may be made out of suitable glasses, or other materials that are substantially clear or translucent to wavelengths of light in the visible range.

The thicknesses of layers 306B and 306C may be varied. In some embodiments, layers 306B and 306C have thicknesses in excess of ½ mm (500 µm). For example, in an example embodiment, layers 306B and 306C have thicknesses in the range of 1 mm to 5 mm. In some cases, layers 306B and 306C are significantly thicker than ESR layer 306A. For example, one or both of layers 306B and 306C may have a thickness that is at least 5 times that of a thickness of ESR layer 306A.

As shown in FIG. 3A, display system 300 comprises a reflector 308 at or behind backlight unit 302. Reflector 308 may, for example, comprise an ESR layer or a diffuse scatterer such as a suitable white ink or white paint. An optical cavity 309 is defined between reflector 308 and layer 306A of light control layer 306. 5 In the illustrated embodiment, light is emitted by backlight unit 302 toward light control layer 306. At light control layer 306, some of the light is reflected and some of the light is transmitted. The transmitted light passes to light valve layer 304. Reflected light passes to reflector 308 and is recycled by being reflected back toward light control layer 306.

In some embodiments, backlight unit 302 comprises a plurality of individually controllable light emitters. The light emitters may be arranged such that the amount of light emitted by backlight unit 302 can be made to vary from location to location across backlight unit 302 by controlling the amounts of light emitted by different ones of the individually-controllable light emitters. Providing a light control layer 306 as described herein can provide special advantages in some embodiments that also have a locally controllable backlight unit 302.

The reflectivity of light control layer 306 may be controlled by choosing an appropriate material for layers 306B and 306C (or one of these layers if the other is not present). A main parameter that affects the reflectivity of light control layer 306 is the index of refraction of the material of layers 306B and 306C that is in optical contact with ESR layer 306A. The reflectivity of light control layer 306 may be controlled to adjust the point spread function of light from backlight unit 302 that emerges from layer 306. In general, the higher the reflectivity of layer 306, the more layer 306 will broaden the point spread function of light from backlight unit 302. Increased broadening may be desirable, for example, where backlight unit 302 comprises a relatively sparse array of LEDs and where backlight unit 302 comprises LED that output light over a narrow angular aperture.

The construction of light control layer 306 may be varied in a number of ways. These include whether one, or the other, or both of layers 306B and 306C are present, the relative thicknesses of layers 306B and 306C (in some embodiments, layer 306B is thicker than layer 306C), the materials of which layers 306B and 306C are made (it is not mandatory that layers 306B and 306C, if both present, be made of the same material), the refractive indices of layers 306B and/or 306C (it is not mandatory that layers 306B and 306C, if both present, have the same index of refraction), the construction of ESR layer 306A (in some embodiments, ESR layer 306A is constructed to provide a reflectivity of less than 96% in the absence of layers 306B and 306C), the number of ESR layers present in light control layer 306, the spacing between refraction layer 306B and light valve layer 304 may be eliminated or increased to provide control over the spread of light incident on light valve layer 304, the presence or absence of surface-relief holographic diffuser elements on surfaces of layers 306B and/or 306C, and the presence or absence of scattering centers in layers 306B and/or 306C and, in embodiments where such scattering centers are present, the nature of the scattering centers and their distribution in three dimensions within the layer 306B and/or 306C.

Scattering centers in layers 306B and/or 306C may comprise, for example, one or more of particles of any suitable pigment, the pigment may comprise TiO2, for example, refractive light scatterers such as small glass beads or other refractive light scatterers (in some embodiments the refractive light scatterers comprise, for example, a high refractive index glass and/or a material having an index of refraction of at least 1.6 or at least 1.7), dislocations, bubbles or other discontinuities of the material of layers 306B and 306C and the like.

Scattering centers may range in size from, for example, nanometers to 100 micrometers. In some embodiments the scattering centers are Lambertian or nearly so. In alternative embodiments the scattering centers may be ansiotropic scatterers. In some embodiments the anisotropic scatterers are oriented such that they scatter light traveling in certain preferred directions more than light traveling in other directions and/or tend to scatter light more in some directions than in others. For example, in some embodiments, anisotropic scatterers are oriented such that they tend to scatter light more in the direction of valves 304 than in the direction of reflector 308 or directions generally parallel to the plane of layer 306.

Under techniques as described herein, quantum dots may be added to one or more of various parts in the display system 300. For example, the backlight unit 302 may be a quantum-dot light source component, or a non-quantum-dot light source. Additionally and/or optionally, the light valve layer 304 may be covered by color filters that comprise quantum dots in addition to or in place of dye color agents or materials.

In some embodiments, quantum dots may be added to one or two optical layers (e.g., one or both of layers 306B and 306C) adjacent to a reflector layer (e.g., layer 306A). More than one reflector layer and more than two optical layers adjacent to reflector layers may be configured in the optical configuration of the display system 300. Any number of quantum dot optical layers may be used in the optical configuration.

FIG. 3B through FIG. 3D illustrates some example configurations of quantum dots used in leaky ESR applications, in accordance with some possible embodiments of the present invention. As illustrated, quantum dots may be in a layer combined with, or in addition to, a diffusion layer. FIG. 3B illustrates an example configuration in which a single layer containing quantum dots is in between backlight and an ESR. FIG. 3C illustrates an example configuration in which two layers containing quantum dots are located above and below an ESR. FIG. 3D illustrates an example configuration in which a single layer containing quantum dots is on a side, of an ESR, which is opposite to the side at which backlight is located.

Appropriate design of light control layer 306 can assist in shaping point spread functions which define how light from individual light emitters is distributed over light valve layer 304. FIG. 4A is a plot of light intensity as a function of position on light valve layer 304 that compares a typical point spread function 410 to an enhanced point spread function 402. Line 404 indicates the optical axis of a light emitter. In typical point spread function 410, light is distributed according to a bell-shaped distribution having a curved peak region 406A and extended tail regions 406B. Tail regions 406B contain a significant proportion of the light emitted by the light emitter that reaches the light valve layer 304. By contrast, in an enhanced point spread function 402, tails 408A are suppressed and peak 408B is softened. A suitable distribution of quantum dots and scattering centers in light control layer 16 may both soften peaks of point spread functions and suppress tails of point spread functions. As a result, energy of light from the light emitter is distributed more in the softened peak 408B, while energy of light in the tails 408A is reduced. In some possible embodiments, quantum dots in the light control layer 16 may be relatively concentrated around line 404. In an example, quantum dots may be confined in closed spatial regions around line 404 of each light emitter. In another example, quantum dots may be gradually tapered off as their distance to line 404 increases. In yet another example, quantum dots may become gradually concentrated as their distance to line 404 increases, for example, to create broadly diffused light illumination over the light valve layer 304.

Figure 4B:
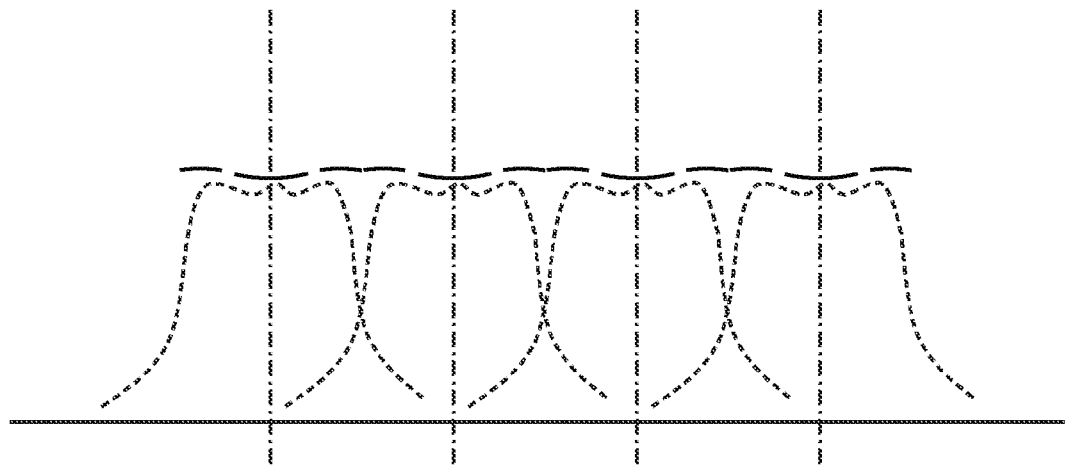
Figure 4C:
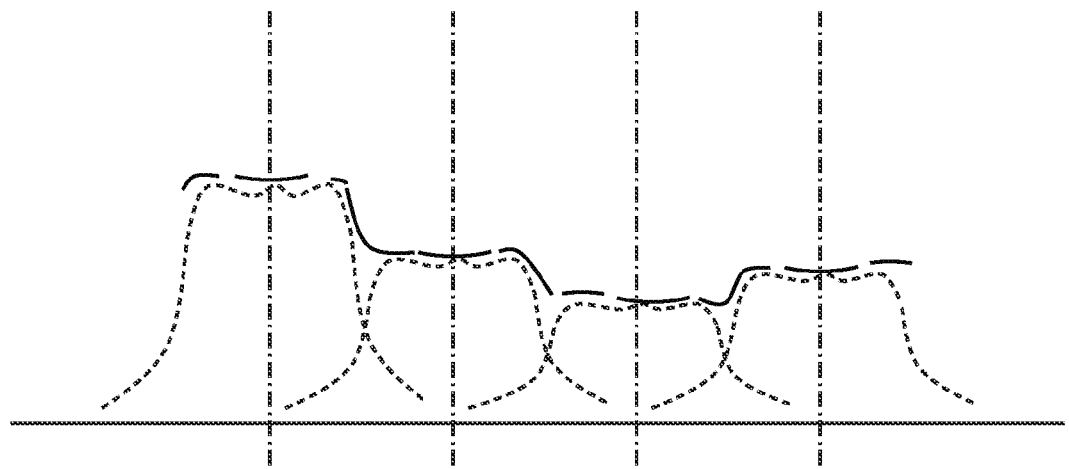

FIG. 4B and FIG. 4C illustrate that, where light from light emitters is distributed according to enhanced point spread function 402 and the light emitters are appropriately spaced apart, then a light field can be provided in which the light varies smoothly. In the light field, the light intensity at any point on light valve layer 304 is the sum of the light reaching that point from all light emitters of backlight unit 302. In FIG. 4B, all of the light emitters are being operated at the same output level. In FIG. 4C, the output level of some light emitters has been reduced. From FIG. 4B, it can be seen that the softening of the peaks of point spread functions facilitates achieving a reasonably uniform light field with relatively widely-spaced light emitters. In this example, the light emitters are spaced apart by a distance that is substantially equal to the full-width at half maximum of the point spread functions. From FIG. 4C it can be seen that the suppression of tails of point spread functions facilitates greater contrast between the darkest and brightest parts of the light field and facilitates achieving a transitions from bright to dark over shorter distances.

In some possible embodiments, quantum dots in the light control layer 306 may form a pattern that mirrors the pattern formed by light emitters of the backlight unit 302. In some possible embodiments, one or more quantum dot layers (films, sheets, etc.) may be used in the optical configuration of the display system 300. A quantum dot layer may be formed by adding quantum dots to an (e.g., existing or new) optical layer including the reflector layer 306A or adjacent layer 306B or 306C. To add the quantum dots, the quantum dots may be coated, attached to, or otherwise disposed on the top surface, the bottom surface, or both surfaces of the optical layer.

In embodiments in which a quantum dot layer is disposed adjacent to a reflector layer as described herein, the air gap between the quantum dot layer and the reflector layer may be zero. In other embodiments, the quantum dot layer and the reflector layer may be separated by air with a non-zero air gap.

5. Quantum Dot Reflectors

Quantum dots may be used as a part of a reflector layer or component to form a quantum-dot reflector. A quantum-dot reflector may, but is not limited only to, be used in a light unit such as a backlight unit or a sidelight unit. FIG. 5A through FIG. 5F illustrate example configurations in which quantum dot reflectors are used with some types of light source components, for example, in light units, in accordance with some possible embodiments of the present invention.

Figure 5A:
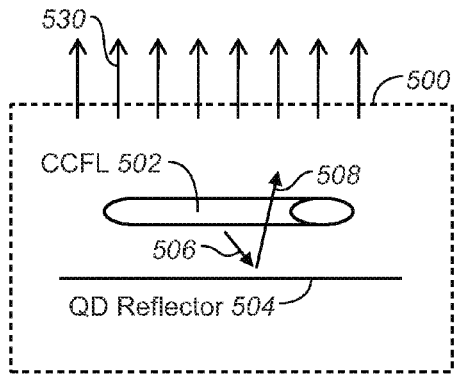
FIG. 5A through FIG. 5F illustrates example configurations in which quantum dot reflectors are used with light source components, in accordance with some possible embodiments of the present invention.

As illustrated in FIG. 5A, a light unit 500 may comprise one or more light source components such as cold cathode fluorescent light (CCFL) source 502, and at least one quantum-dot reflector. As used herein, a quantum-dot reflector refers to a reflector layer (which may be metallic or non-metallic) disposed with quantum dots in any of a variety of ways so long as the quantum dots receive first light 506 as excitation light and generate second light 508 in certain light wavelengths intrinsic to physical properties of the quantum dots. In some embodiments, light (e.g., 530) emitted by the light unit (500) comprises only the second light (508). In some embodiments, light (e.g., 530) emitted by the light unit (500) comprises both the second light (508) and at least a portion of first light (506). In some embodiments, properties of the quantum-dot reflector are pre-configured such that light (530) emitted out of the light unit (500) are of a specific composition of different colors and/or a specific white point (standard-based or non-standard-based).

Figure 5B:
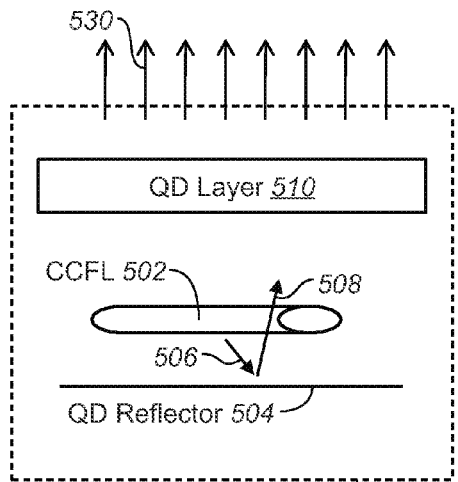

As illustrated in FIG. 5B, the light source (500) may further comprise another optical layer. For the purpose of illustration only, the light source (500) may comprise a quantum-dot layer (510), which may be excited with illumination from a portion of the first light (506) and/or a portion of the second light (508) emitted by a backlight unit (e.g., 500), and regenerate additional second light in the light (530) emitted by the light source (500).

In the embodiments illustrated in FIG. 5A and FIG. 5B, the light (530) may comprise only second light (508) as visible light, or may alternatively comprise both first light (506), which may or may not be regenerated by quantum dots, and second light (508), which is generated from the quantum dots in the light source (500), as visible light.

Figure 5C:
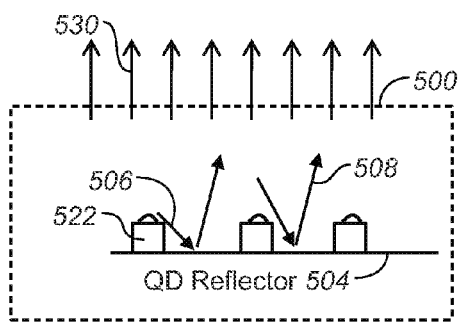
Figure 5D:
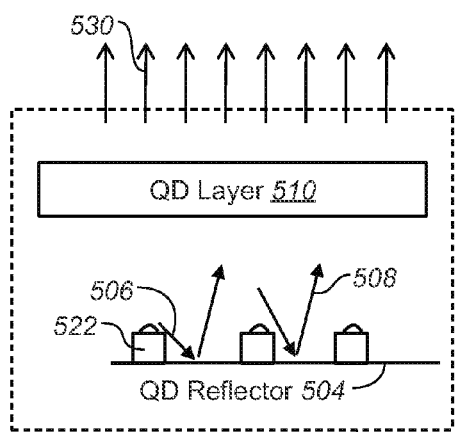

FIG. 5C and FIG. 5D illustrate example configurations of a light source (e.g., 500) similar to FIG. 5A and FIG. 5B, respectively, but LED light source components (522) are used instead of CCFL components.

Figure 5E:
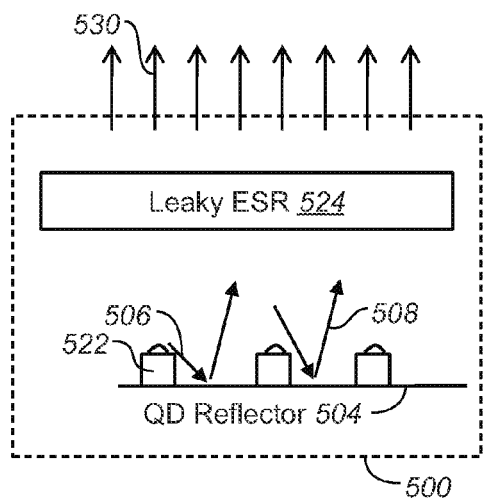
Figure 5F:
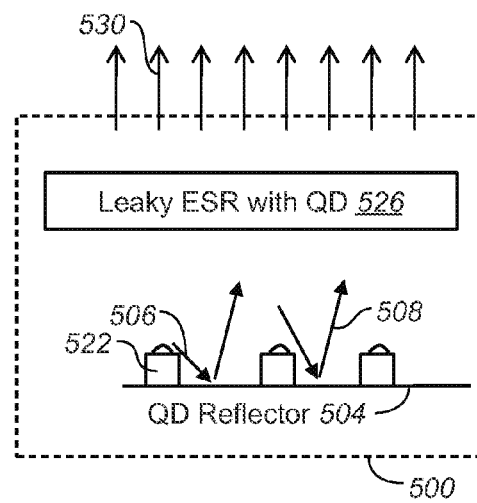

A light source as described herein may comprise other types of optical layers other than, or in addition to, the QD layer (510) as illustrated in FIG. 5B and FIG. 5D. For example, as illustrated in FIG. 5E and FIG. 5F, a leaky ESR layer (e.g., 524) and/or a leaky ESR with QD (quantum dots) layer (e.g., 526) may be used in a light source (e.g., 500) as described herein.

6. Quantum Dots in Color Filters and OLED Pixels

Figure 6A:
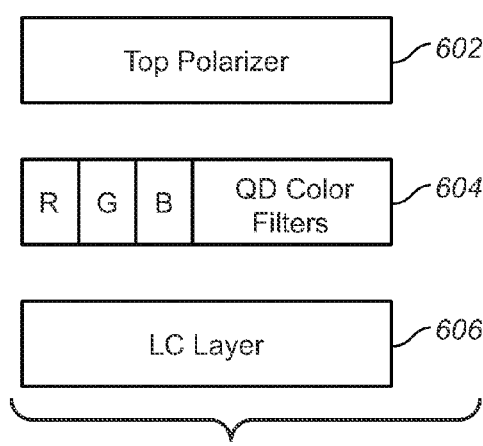
Figure 6B:
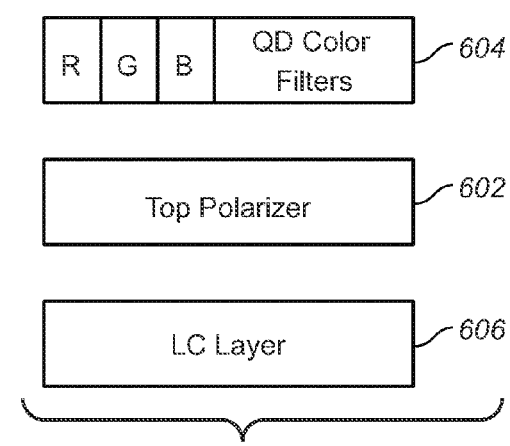

Quantum dots may be used in addition to, or alternatively in place of, dye coloring materials in color filters. These quantum dot color filters may be used to impart colors for pixels or light valves. As shown in FIG. 6A, a layer 604 of quantum dot color filters may be disposed between a liquid crystal layer 606 (comprising light valves) and a top polarizer 602. Alternatively, as shown in FIG. 6B, layer 604 of quantum dot color filters may be disposed on top of top polarizer 602. As illustrated in FIG. 6C and FIG. 6D, quantum dot color filters may also be placed in other locations of an optical configuration of a display system. For example, QD color filters may be placed before or after liquid crystal layer 606, or before or after a bottom polarizer 608. As used herein, "top" refers to a viewer facing side or surface of a display panel, while "bottom" refers to a side or surface of the display panel away from a viewer of the display panel.

In some embodiments, a pixel may comprise a plurality of sub-pixels each configured to impart a specific primary color in a plurality of primary colors (e.g., R, G and B) imparted by the sub-pixels in the pixel. A quantum dot color filter may be used to cover a sub-pixel of a specific color. Colors imparted by all the sub-pixels in the pixel together form a color gamut by the display system.

In various possible embodiments, quantum dot color filters may be used in an optical configuration in which a top polarizer, a bottom polarizer or both polarizers may not be present.

Quantum dots may be used to compensate organic light emitting diodes (OLEDs) in a display system. As illustrated in FIG. 7, pixels 702-1, 702-2, etc. in a display system 700 may comprise OLEDs (e.g., 704 in pixel 702-1) configured to emit a combination of primary colors for a color gamut. In some possible embodiments, the OLED may be weak in certain colors, for example, blue. OLEDs in each pixel may be compensated with quantum dots (e.g., 706). The quantum dots may be used to emit one or more specific colors (for which OLEDS may be weak) such as blue. Quantum dots in an OLED display system may be interlaced with OLEDs in the same optical layer. Alternatively and/or optionally, a layer comprising OLEDs may be covered on top or bottom with a quantum dot sheet or a quantum dot layer.

7. Quantun Dots in N Modulation Display Systems

Under techniques described herein, an imaging system may comprise a light source capable of emitting light of different colors in different time intervals and stacked display panels comprising at least one monochromatic display panel. As used herein, a light source may comprise, but is not limited to, light-emitting diodes, light conversion materials such as quantum dots that regenerate light, incandescent light, fluorescent lights, etc. A display panel may be any display system that comprises a plurality of light valves as pixels, including liquid crystal display, quantum dots display, plasma display, digital micro shutter, multiplexed optical shutter, etc.

In some possible embodiments, some or all of stacked display panels described herein may be monochromatic liquid crystal displays (LCDs). The display panels may be capable of controlling transmittance levels on the basis of individual pixels per each display panel. Sequential emission by the light source of light of different colors may be integrated to create an appropriate color perception for image frames. In some possible embodiments, display panels with no or little use of color filters provide substantial improvement in brightness (four to five times brighter) over color display panels with color filters. Further, stacking monochromatic display panels increases the maximum contrast ratio supportable by an imaging system. For example, two display panels each with a maximum contrast ratio of N:1 may be used to result in a display unit with an effective maximum contrast ratio of $N^2$:1 contrast ratio.

Light bleeding between different colors and between neighboring portions of illumination may be reduced and/or eliminated. For example, in some embodiments, since light of different colors is emitted in different time intervals, color bleeding is prevented or greatly reduced in an imaging system as described herein. Additionally and/or optionally, in some embodiments, at least one of the monochromatic display panels may set certain display portions to dark black, while other display portions on the display panel are illuminated, thereby preventing light bleeding from the illuminated portion to neighboring display portions. Additionally and/or optionally, in some embodiments, individual light sources in a plurality of light sources may be controlled based on image data to turn off lighting to certain display portions on the display panels, while other individual light sources may be controlled to turn on lighting to other display portions on the display panels, thereby preventing light bleeding from the illuminated portion to neighboring display portions and providing a relatively wide color gamut for a display unit.

Under techniques as described herein, the loss due to color filters are avoided or reduced. More light may transmit through the front of screen. For example, a display panel (e.g., LCD) with color filters may allow 4% of light transmission, while a monochromatic LCD panel without color filters may allow as much as 40% of light transmission. Stacking two monochromatic LCD panels in a display unit may still allow 20% of light transmission, which is five times of the light transmission of a single LCD panel with color filters, thereby creating a display unit with high brightness.

In some possible embodiments, a monochromatic display panel may be manufactured by simplifying the process that produces color display panels. In addition, a color pixel in a color display panel may be used to create three pixels for a monochromatic display panel in the simplified manufacturing process, thereby significantly increasing the spatial resolution of the monochromatic display panel.

Additionally and/or optionally, a light source with an accurate profile of light wavelengths and/or intensities may be used in a display system as described herein, resulting in illuminating pixels in the display system with white light at a particular white point (e.g., D65 or D50) in a color gamut supported by the display system. Thus, images created by the display system may be highly accurate in terms of color values. In order to get a desired white point the mixes of the Quantum Dots of the primaries may not by themselves result in a particular white point but with the different characteristics of the systems such as the profile of the color filters this can result in an accurate white point. In some possible embodiments, quantum dots may be disposed in front of (e.g., LCD) pixels, and/or replace one or more color filters that would be placed in front of the pixels. In some possible embodiments, replacing the color filters with quantum dots of a particular regeneration frequency gives better performance. In some possible embodiments, a patterned quantum dot layer may sit directly over other light sources (e.g., LEDs, other quantum dots light sources, etc.) as a sheet but may be patterned in such a way to be disposed over LEDs of a particular color (e.g., blue). The patterned quantum dot layer may be used to regenerate light of particular wavelengths or the particular color accurately. In some possible embodiments, a quantum dot layer with multiple types of quantum dots or multiple patterned quantum dot layers may be used to control multiple primary colors in a color model to provide wide color gamuts of three, four, five, six (primary colors), or more, for example, as described in ITU-R Recommendation BT.709 by International Telecommunication Union and CIE L*a*b* (CIELAB) by the International Commission on Illumination, which are incorporated herein by reference for all purposes as if fully set forth herein.

FIG. 8A through FIG. 8F illustrate example configurations of high-contrast display systems that comprise multiple LCD layers, zero or more optical stacks not containing quantum dots (denoted as "Optical Stack"), and zero or more optical stacks containing quantum dots (denoted as "QD's"), in accordance with some possible embodiments of the present invention.

As illustrated, the multiple LCD layers may, but are not limited to, comprise an LCD color layer (denoted as "LCD Color") and an LCD achromatic layer (denoted as "LCD Achromatic"; which, for example, may be monochromatic). It should be noted that any controllable light valve layer, not necessarily LCD-based, may be used in addition to, or in place of, an LCD achromatic layer as described herein.

Figure 8A:
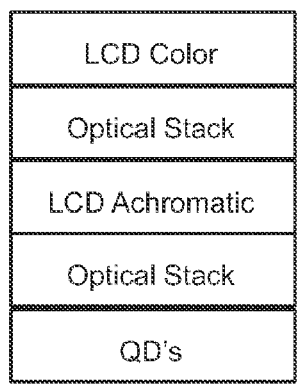
FIG. 8A through FIG. 8F illustrate example configurations of high-contrast display systems that comprise multiple LCD layers, zero or more optical stacks not containing quantum dots, and zero or more optical stacks containing quantum dots, in accordance with some possible embodiments of the present invention.
Figure 8B:
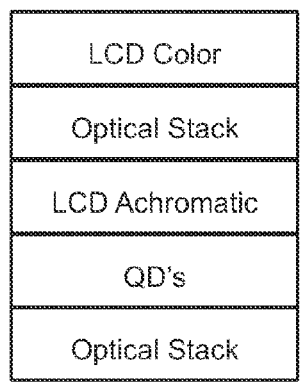
Figure 8C:
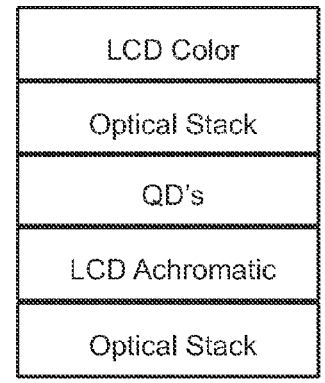
Figure 8D:
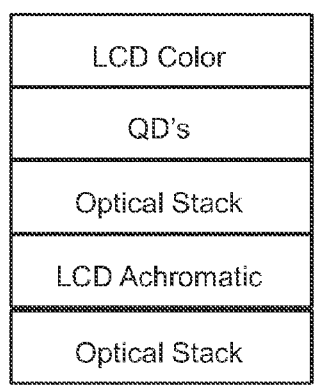
Figure 8E:
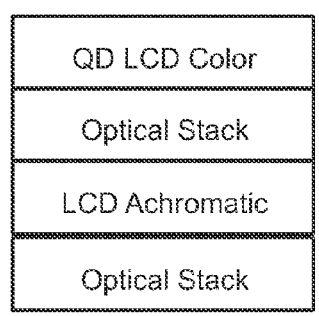
Figure 8F:
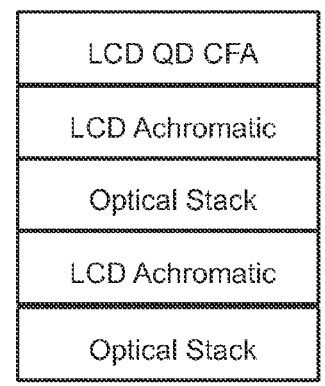

An optical stack may refer to zero, one or more of the sheets such as DBEF, FEF, high contrast films, diffusers (bulk or thin), etc. As illustrated in FIG. 8E, quantum dots may be used in an LCD color layer to replace, or to alternatively be added with, dye-based (or other non-quantum-dot-based) color filters. A top polarizer may or may not be used with quantum-dot based color filters or quantum-dot-based LCD color layer. Furthermore, if a top polarizer is used, the top polarizer may be placed on top of or alternatively below the quantum dots in the LCD layer. In example embodiments as illustrated in FIG. 8E and FIG. 8F, quantum dots may be disposed with a LCD color layer or with a color filter array (LCD QD CFA of FIG. 8F) that covers a LCD achromatic layer. Under techniques herein, as colors are imparted at least in part by light conversion materials (e.g., quantum dots) other than passive color filtering materials (e.g., dye-based color filtering materials), a display system may achieve a significantly high brightness level as compared with display systems without using the techniques. Using multiple LCD panels to modulate/regulate light output levels towards a viewer also increases the maximum contrast level that may be supported by a display system. As used herein, an LCD panel in these configurations may be replaced with a panel that supports transmitting light on a pixel basis but uses technologies other than LCD such as electrowetting, other types of cholesteric-based display technologies, etc. In some embodiments, a display system herein may support modulating/regulating light output levels with two (or more) LCD display panels, as enabled by much less optical loss under techniques herein. In these embodiments, the LCD display panels may be set to panel-specific light valve values to regulate their respective light output levels. For example, dual modulation of light output levels with two LCD panels may be realized with constant light. In some embodiments, triple modulation or more of light output levels may also be realized, for example, with more than two LCD display panels and/or with modulated light, as emitted from a back light unit that supports local dimming, that illuminates different portion of image with different intensities/strengths of light based on image data. Since the maximum transmission of light is increased significantly with use of non-passive color filtering materials (e.g., quantum dots), more than one level of light modulation may be implemented in a display system under techniques as described herein to support much higher contrast level (e.g., HDR) than display systems without using techniques herein.

8. Light Source Controller

Figure 9:
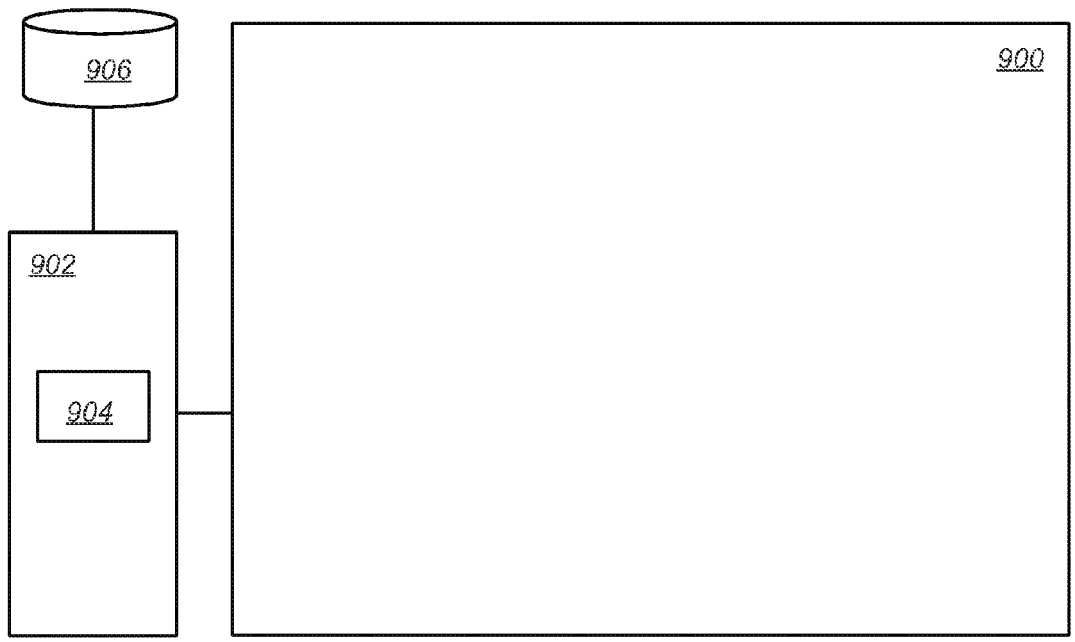
FIG. 9 illustrates a display system comprising a light source and a light source controller configured to receive image data from an image data source, in accordance with some possible embodiments of the present invention.

As shown in FIG. 9, a display system as described herein may comprise a light source 900 and a light source controller 902 configured to receive image data from an image data source 906. Each light source component that emits first light in the light source 100 may be set with a local intensity state. The light source controller 902 may be configured to set the operational states of the light source components such as LEDs to provide the desired dimming level for a region of a display panel in the display system based on the image data received from the image data source 906. The image data may be provided by the image data source 906 in a variety of ways including from over-the-air broadcast, a set-top box, a networked server coupled to the display system, and/or a storage medium. The light source controller 902 may comprise sampling logic 904 to sample image data and compute, based on the image data, luminance values and/or color values of individual pixels, individual groups of pixels, or individual portions of an illuminated surface such as a surface of the diffuser or the display panel. The results of sampling and computing may be used by the light source controller 902 to drive individual light source components or individual groups of light source components that emit first light to cause one or more light conversion layers (which, for example, comprise quantum dots) to regenerate second light.

In some possible embodiments, a light source component that emits first light may have a single operational state: fully on. In some possible embodiments, a light source component may have two or more operational states: off, on (fully on or a maximum intensity level), and one or more intermediate intensity levels (dimmed states).

In some possible embodiments, based on the image data, a light source controller as described herein may determine that a designated region on the display panel should be illuminated at a certain level and accordingly determine that specific light source components should be set in a corresponding operational state. This determination may be repeated by the light source logic for all of the controllable light source components in the system.

9. Example Process Flow

Figure 10:
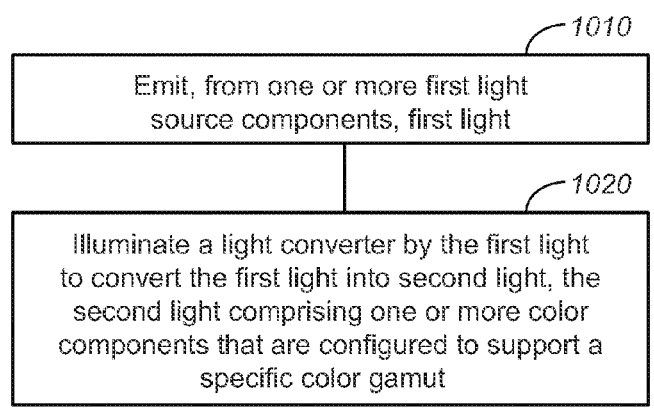
FIG. 10 illustrates an example process flow, according to a possible embodiment of the present invention.

FIG. 10 illustrates an example process flow according to a possible embodiment of the present invention. In some possible embodiments, one or more computing devices or components in a display system may perform this process flow.

In block 1010, a light source (e.g., 900) causes one or more first light components to emit first light. The first light source components may comprise lasers, light-emitting diodes including single colored light-emitting diodes, fluorescent lights including cold cathode fluorescent lights, quantum-dot-based light source components, or non-quantum-dot-based light source components.

In block 1020, the light source (900) causes a light converter to be illuminated by the first light. The light converter converts the first light into second light comprising one or more color components that are configured to support a specific color gamut.

In some embodiments, the light converter comprises one or more light conversion materials illuminated by the first light from one or more of back light units (BLUs), or side light units (SLUs). Light conversion materials as described herein may be disposed with one or more of brightness enhancement films (BEFs), double brightness enhancement films (DBEFs), bulk diffusers, thin diffusers, contrast layers, etc. Light conversion materials as described herein may be disposed between the first light source components and a plurality of light valves, between the plurality of light valves and a surface of the display system facing a viewer, below, above or within an optical layer, in between two optical layers, etc.

In some embodiments, the light converter comprises one or more groups of quantum dots, each group of quantum dots being configured to produce a color component in the one or more color components. In some other embodiments, quantum wells or other light conversion materials may be used instead of, or in addition to, quantum dots.

In some embodiments, the light source (900) is a part of a display system, which is configured to direct the second light to illuminate one or more display panels.

In some embodiments, the light converter comprises a pattern of spatially non-overlapping light conversion units. In some embodiments, each of the spatially non-overlapping light conversion units is configured to produce a part of a single color component in the second color components in the second light, while in some other embodiments, each spatially non-overlapping light conversion unit is configured to produce a part of all color components in the second color components in the second light.

In some embodiments, the light converter comprises one or more optical layers disposed with one or more light conversion materials. The one or more light conversion materials may comprise one or more of (a) quantum dots coated on a surface of an optical layer, (b) quantum dots embedded within an optical layer, or (c) quantum dots in a quantum dot sheet disposed on a surface of an optical layer. In some embodiments, at least one of the one or more optical layers is an optical waveguide, a mirror surface, a bumpy surface, at least one total reflection surface, etc.

In some embodiments, at least one of the one or more optical layers in the light converter is disposed adjacent to an enhanced specular reflector (ESR). In some embodiments, the light converter comprises one or more of (a) light conversion materials disposed only at or near a top surface of the ESR, (b) light conversion materials disposed only at or near a bottom surface of the ESR, or (c) light conversion materials disposed at or near both top and bottom surfaces of the ESR. In some embodiments, the at least one of the one or more optical layers comprises scattering centers directing regenerated light towards a plurality of light valves, is in optical contact with the ESR, is of a refractive index closer to a refractive index of the ESR than a refractive index of an air gap, and/or is disposed adjacent to the ESR without any air gap. In some embodiments, two (e.g., above and below the ESR) of the one or more optical layers are disposed adjacent to the ESR without any air gap.

In some embodiments, light conversion materials as described herein are configured to increase and evenly distribute energy of regenerated light in a central portion of a point spread function of a light source while reducing the energy of regenerated light in tail portions of the point spread function of the light source.

In some embodiments, a light converter as described herein may comprise a plurality of color filters with color-imparting materials comprising one or more light conversion materials such as quantum dots, quantum wells, etc. Each of the color filters may cover a different pixel in a plurality of pixels. Alternatively and/or optionally, each of the color filters may cover a different sub-pixel of a pixel in a plurality of pixels, each pixel comprising two or more sub-pixels.

In some embodiments, color filters as described herein may be disposed before a top polarizer, disposed after a top polarizer, with no top polarizer, before light valves, after light valves, before a bottom polarizer, after a bottom polarizer, without a bottom polarizer, etc.

In some embodiments, light conversion materials as described herein may be used in an OLED display system to compensate in one or more specific colors (e.g., blue) for organic-light-emitting-diode (OLED) based pixels. In some configurations, the quantum dots and the organic-light-emitting-diode (OLED) based pixels are interleaved, while in some other configurations, the quantum dots are located in a separate layer from another layer comprising the organic-light-emitting-diode (OLED) based pixels.

In some embodiments, a display system as described herein is configured to support one or more of a Digital Cinema Initiative (DCI) color space, an Academy Color Encoding Space (ACES) P3, P4, P5, or P6 color space, a color space specified in the International Telecommunication Union Radio Communication Sector (ITU-R) BT.709 Recommendation standard of the International Telecommunications Union (ITU), a color space in compliance with the Reference Input Medium Metric/Reference Output Medium Metric (RIMM/ROMM) standard, a non-standard-based color space, etc.

In some embodiments, a display system as described herein is configured to illuminate a plurality of display panels with the second light regenerated from one or more light conversion materials in the light converter. The plurality of display panels may comprise at least one achromatic liquid crystal display panel, one or more liquid crystal display panels that impart colors for rendering color images based on received image data. The one or more liquid crystal display panels may comprise quantum dot color filters that impart the colors for rendering the color images based on the received image data.

In various embodiments, a light converter as described herein may comprise one or more of (a) light conversion materials between a backlight unit and one or more optical stacks adjacent to the backlight unit, (b) light conversion materials between one or more optical stacks adjacent to a backlight unit and the plurality of display panels, (c) light conversion materials between at least one display panel in the plurality of display panels and at least another display panel in the plurality of display panels, (d) light conversion materials between one or more optical stacks not adjacent to a backlight unit and at least one display panel in the plurality of display panels, (e) light conversion materials disposed near one or more surfaces of one or more display panels in the plurality of display panels, etc.

In some embodiments, a display system as described herein may comprise a reflector disposed with one or more light conversion materials configured to regenerate second light with at least a portion of the first light from one or more first light source components.

In some embodiments, the light converter as described herein comprises quantum dots selected based on one or more of size, geometry, or temperature characteristics.

In some embodiments, at least one of absolute intensity or relative intensity of color components in the second light is monitored and regulated.

In some embodiments, the display system is configured to employ one or more pulse-width modulation (PWM) control signals to control relative and/or absolute intensities of at least one color component in the second light between a minimum intensity and a maximum intensity.

10. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
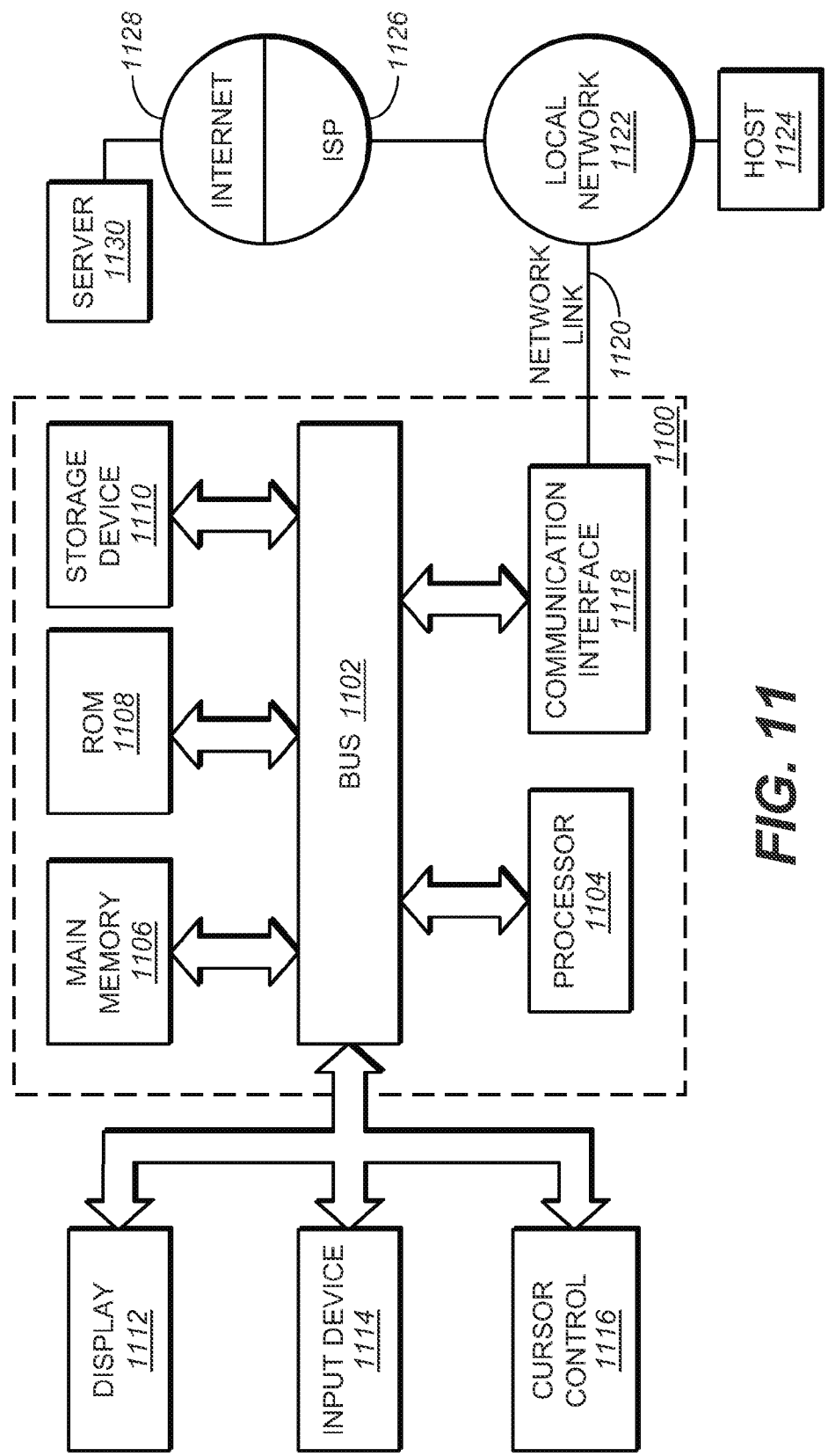
FIG. 11 illustrates an example hardware platform on which a computer or a computing device as described herein may be implemented, according a possible embodiment of the present invention.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a liquid crystal display, for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

11. Equivalents, Extensions, Alternatives and Miscellaneous

In the foregoing specification, possible embodiments of the invention have been described with reference to numerous particular details that may vary from implementation to implementation. Thus, the sole and exclusive indicator of what is the invention, and is intended by the applicants to be the invention, is the set of claims that issue from this application, in the particular form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In some possible embodiments, quantum dots that regenerate light at particular colors may replace color filters. Thus, in these embodiments, light valves such as one or more LCD panels comprising pixels or sub-pixels may be further away from a viewer than, and behind, the quantum dots. For example, a sub-pixel that is to transmit green light may be coated with quantum dots that emit regenerated green light; a sub-pixel that is to transmit blue light may be coated with quantum dots that emit regenerated blue light; a sub-pixel that is to transmit red light may be coated with quantum dots that emit regenerated red light. Other color systems other than RGB may also be used. For instance, 3, 4, or five different color lights may be used in a display system as described herein. In some embodiments, instead of using color filters to produce colors, quantum dots that regenerate these different colors may be coated on pixels or light valves, whether these pixels or light valves are LCD-based or not.

In some possible embodiments, a light source (e.g., that uses quantum dots to regenerate lights at very precise wavelengths in prescribed ranges) as described herein may be used in various types of configurations including those with zero, one, two, or more display panels. A display panel as described herein may or may not be LCD-based. In some embodiments, a light source as described herein may be used in a system with two display panels. In an example, one display panel in such a system may be a black-and-white display panel while another display panel in the same system may be a color display panel. Additionally and/or optionally, one display panel in a system may be a high transmission display panel while another display panel in the same system may be a lower transmission display panel. Furthermore, a light source as described herein may support two or more display panels in any order. For example, a black-and-white display panel may be before or after a color display panel. Additionally and/or optionally, a high transmission display panel may be before or after a low transmission display panel. A light as described herein may be used in a system that uses various types of display panels. In an example, a display panel may be based on electrowetting, plasma, front projection, liquid crystal, etc. Liquid crystal display panels may comprise light valves that use various types of liquid crystal materials, organic (e.g., cholesterol), inorganic, lyotropic liquid crystals, electrically controlled birefringence (ECB) liquid crystals, etc.

In some possible embodiments, a light source (e.g., that uses quantum dots to regenerate lights at very precise wavelengths in prescribed ranges) as described herein may be used in various types of optical configurations including zero, one, two, or more optical components of a kind. For example, in some embodiments, a light source as described herein may be used in a system with zero, one, two, or more polarizers.

In some possible embodiments, a light source as described herein may comprise different types of light source components and different types of quantum dots. For example, in some possible embodiments, two types of LEDs may be used. Blue LEDs or first frequency LEDs may be used to regenerate blue quantum dot frequency light and red quantum dot frequency light. Optionally and/or alternatively, a part of the blue LED light may be directly passed through to illuminate a target such as a diffuser or a display panel, while the remaining part of the blue LED light may be used to regenerate the red quantum dot frequency light. Additionally and/or optionally, green LEDs or second frequency LEDs may be used to regenerate green quantum dot frequency light. Optionally and/or alternatively, the green LED light may be directly passed through to illuminate a target such as a diffuser or a display panel. In some possible embodiments, techniques as described herein may modulate and/or control blue and red light as a first set of light, and modulate and/or control green light separately as a second set of light, thereby eliminating possible overlap between these two sets of light that would exists should light of blue, green, and red be modulated and controlled together.

In some possible embodiments, a light converter or regenerator as described herein may be configured to control its input sensitivity to produce a P5 or P6 color gamut. Alternatively and/or optionally, quantum dots may be added on top of one or more LEDS (e.g., each blue LED) such that each LED set can have different compositions of color components according to the local region of color as determined from image data of one or more images to be rendered. Thus, techniques as described herein allow controlling the white point and primary color components in local regions with a light converter and regenerator as described herein that comprises quantum dots.

It should be noted that a light source as described herein may be configured to generate different color components for a different image or image frame. For example, in some possible embodiments in which images are presented in a sequential manner, the light source may generate different color components for different images of a sequence. In some possible embodiments, a single image frame may be sequentially illuminated by a light source as described herein in two or more time intervals during each of which different color components may be used to illuminate a display panel when pixels of the display panel are loaded with image data of the same image frame. For example, in a first time interval, an image frame may be presented with red and blue color components while in a second time interval, the image frame may be presented with a green color component. In a particular embodiment, the frame rate may be reduced proportionally. For example, a half frame rate may be used. Each of the frames at the half frame rate may comprise two illumination intervals during each of which a different set of color components from a light source as described herein is used.

12. Additional Example Embodiments

As described herein, quantum dots may be used in addition to, or alternatively in place of, dye coloring materials in color filters. These quantum dot color filters may be used to impart colors for pixels or light valves. Color filters in a color filter layer in a display system may comprise more than one set of primary colors. For example, two sets of primary colors may be configured in a color filter layer to comprise a first set of primary colors R1, G1 and B1 and a second set of primary colors R2, G2 and B2, as illustrated in FIG. 12A through FIG. 2D.

Figure 12A:
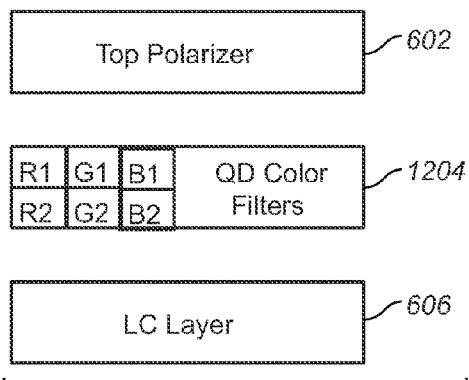
FIG. 12A through FIG. 12D illustrate example color filter configurations that support two sets of primary colors, according to some possible embodiments of the present invention.
Figure 12B:
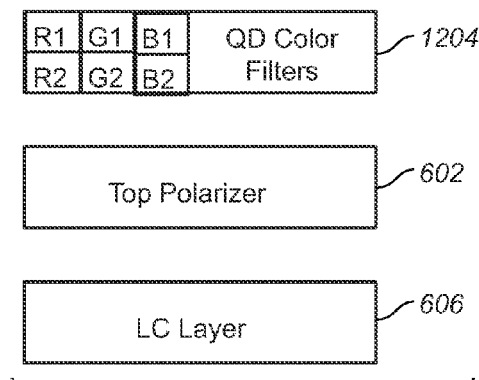
Figure 12C:
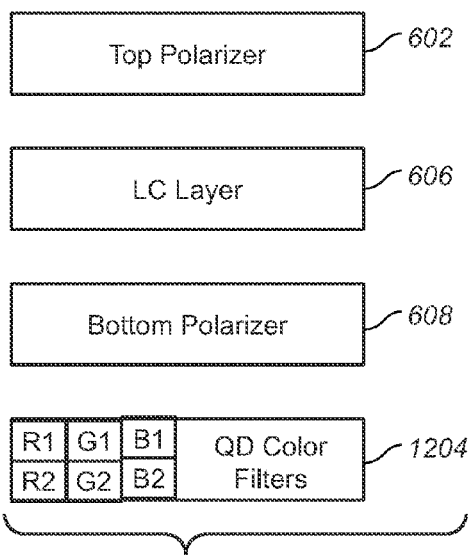
Figure 12D:
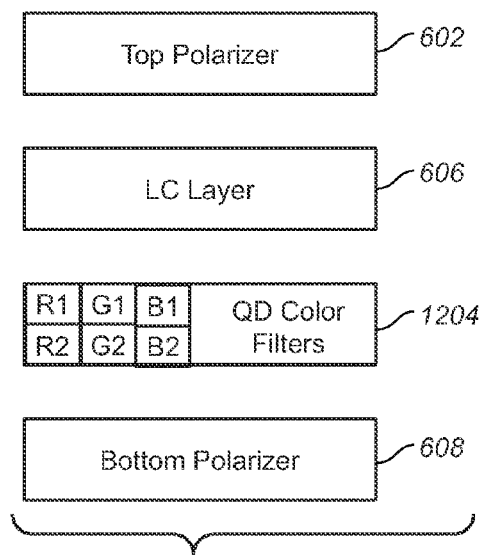

As shown in FIG. 12A, a layer 1204 of quantum dot color filters may be disposed between a liquid crystal layer 606 (comprising light valves) and a top polarizer 602. Alternatively, as shown in FIG. 12B, layer 1204 of quantum dot color filters may be disposed on top of top polarizer 602. As illustrated in FIG. 6C and FIG. 6D, quantum dot color filters may also be placed in other locations of an optical configuration of a display system. For example, QD color filters may be placed before or after liquid crystal layer 606, or before or after a bottom polarizer 608.

In some possible embodiments, quantum dot color filters may be used in an optical configuration in which a top polarizer, a bottom polarizer or both polarizers may not be present.

In some embodiments, first light wavelengths emitted by the first set of primary colors may be different from second light wavelengths emitted by the second set of primary colors.

In some possible embodiments, quantum dots of different colors in each distinct set of quantum dots in color filters may be distributed or disposed in an unmixed pattern with each color at or near separate optical contact areas between the light extractors and the light guide. In some other possible embodiments, quantum dots of different colors in each distinct set of quantum dots may be mixed.

In some embodiments, a pixel may comprise two sets of primary colors (e.g., a first set of R1, G1 and B1 and a second set of R2, G2 and B2) imparted by the pixel. Each set of primary colors may independently support a color space. The composition of the quantum dots may be configured to provide a white point. The white point may be D65 under Rec.709, D50 under P3, or another type of white point (including but not limited only to a standard-based or non-standard-based white point).

In some possible embodiments, the first set of primary colors that independently supports the color space may be used to generate a first image frame, while the second set of primary colors that also independently supports the color space may be used to generate a second image frame. In some possible embodiments, the first set of primary colors emits in first relatively narrow wavelength ranges, while the second set of primary colors emits in second relatively narrow wavelength ranges. The first relatively narrow wavelength ranges may have no or little common wavelength with the second relatively narrow wavelength ranges. The first image frame may be a left view image in 3 dimensional (3D) display applications, while the second image frame may be a right view image in the 3D display applications. The first image frame and the second image frame may be generated in a time-wise frame sequential manner. In some possible embodiments, a viewer may wear a pair of glasses with a left perspective configured to be transmissive for the first wavelength ranges but opaque for the second wavelength ranges, and with a right perspective configured to be transmissive for the second wavelength ranges but opaque for the first wavelength ranges. Under techniques described herein, synchronization between a viewer's glasses and an image rendering system such as a display system is not needed in 3D display applications.

In some possible embodiments, more than one set of primary colors such as illustrated in FIG. 12A through FIG. 12D may be used to correct metamerism errors. Color filters may be configured to support multiple sets of primary colors. Color filters may be configured to support not only 3 primary colors but additional colors. In some embodiments, a RGBW system is made with sub pixels with a mix of RGB QDs and/or optionally with additional types of RGB QDs.

Under techniques as described herein, multiple sets of primary colors may be provided with QD in color filters. Different types of narrowband and/or broadband QD may be disposed with color filters. QD with different primary colors may be used in addition to RGB primary colors. In an example, a pixel may comprise six sub-pixels. Each sub-pixel may be disposed with a narrowband QD of different color. Each subpixel with a color filter is separately controlled. QD color filters may be placed below or above the LC layer. QD color filters may also be placed below or above a top polarizer. The pixels may be used to correct metamerism errors in 2D applications. The pixels may also be used to support 3D field sequential (or frame-sequential) applications with passive 3D glasses. Passive 3D glasses refer to glasses for 3D display application without needing to synchronize with image rendering operations relating to a display panel. Primary R1G1B1 may be used to display a left view image frame, while primary R2G2B2 may be used to display a right view image frame. If the narrowband QDs are excitable with non-overlapping wavelength ranges, two or more of these R1, G1, B1, R2, G2 and B2 QDs may be mixed in the same pixel or sub-pixel.

FIG. 13A illustrates an example configuration for side-lit quantum dot configuration, in accordance with some possible embodiments of the invention. Different colors of quantum dots (denoted as QDs) in a side-lit configuration may be separate in space and separately illuminated by light emitters such as blue LEDs. Emissions from different colors of QDs may be separately modulated to reduce or remove color bleeding due to metameric errors. Because of the metamerism errors, when green QDs and red-blue QDs are illuminated at the same time, color bleeding occurs between green and red, and between green and blue, making relatively saturated red or blue color hard to obtain in a color gamut. As a result, a color gamut is pinched (or shrunk) by failure to achieve the saturated colors because of color bleeding between the green primary color and the other primary colors. In comparison, red and blue QDs may be mixed in some embodiments as very little color bleeding between the red and blue QDs. To reduce the color bleeding, green QDs are placed in a first spatial location and illuminated by a first set of light emitters (e.g., LEDs). Green QDs may be driven harder and dependent on how much green is needed in a display or in an image frame. If very little green is needed, illumination on the green QDs may be reduced accordingly. Red and blue QDs are placed in a second different spatial location and illuminated by a second different set of light emitters. A green QD film may be placed on the left while a red and blue QD film may be placed on the right. The light guide traps light with oblique angles but directs light with non-oblique angles to illuminate towards a viewer.

FIG. 13B illustrates another example configuration for side-lit quantum dot configuration, in accordance with some possible embodiments of the invention. In this side-lit configuration, green QDs are placed in a first spatial location and illuminated by a first set of light emitters (e.g., LEDs). Red QDs are placed in a second different spatial location and illuminated by a second different set of light emitters. Blue QDs are placed in a third different spatial location and illuminated by a third different set of light emitters.

Figure 13C:
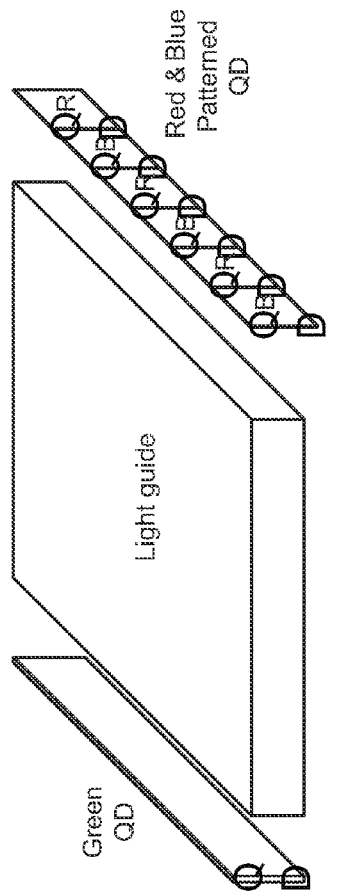

FIG. 13C illustrates another example configuration for side-lit quantum dot configuration, in accordance with some possible embodiments of the invention. Two or more types of QDs may be patterned with distinct areas only for a first type of QDs, distinct areas for a second type of QDs etc. Driving algorithms may be used to reduce inter-area light bleeding (e.g., sequential lighting, intensity adjustment, may be computed based in part on image data). Other types of patterned may be used. In an example, instead of what is depicted, a blue QD film may be placed in a different location from a patterned QD film of red and green colors. In another example, RGB QDs may be patterned, while other primary color QDs (e.g., yellow, cyan, magenta, mixed), in a system using three or more primary colors.

Figure 14A:
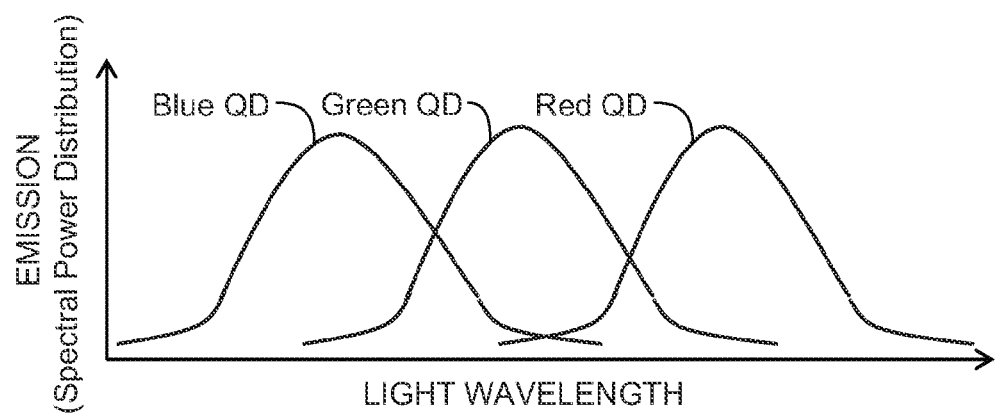
FIG. 14A through FIG. 14D illustrate example controlling of emission from quantum dots, in accordance with some possible embodiments of the invention.
Figure 14B:
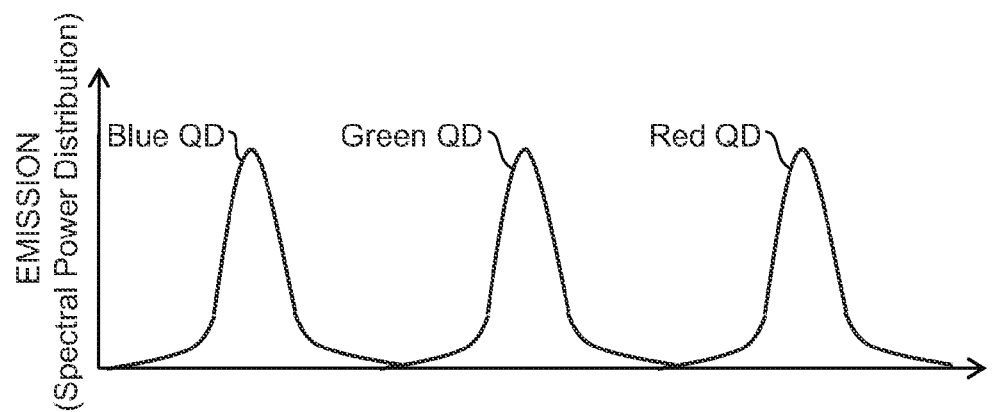

FIG. 14A illustrates example controlling of emission from QD (as regulated by LEDs) in different quantum dot configurations including the side-lit quantum dot configurations shown in FIG. 13A through FIG. 13C, in accordance with some possible embodiments of the invention. Emission from quantum dots may be controlled by adjusting intensities of LEDs that illuminate QDs, respectively. The intensity of the LEDS may vary dependent on 1. based on image data, 2. based on one time calculation of white point (e.g., Rec. 709 D65; P3 D50; custom white point), 3. based on white point calculation from each image frame, and 4. wavelength widths and peak wavelengths of QDs. In different embodiments, emissions from different types of QDs may be non-overlapped or may be overlapped. In some possible embodiments, as illustrated in FIG. 14B, each of the different types of QDs may generate emission with a relatively narrow spectrum with little overlapping between different types of QDs. In some embodiments, the narrower spectrums from different types of QDs are, the less the overlapping between emissions from different types of QDs, and the more precise pure white colors may be produced; however metameric errors could occur for colors that are not pure white colors and/or that are off white colors.

Figure 13D:
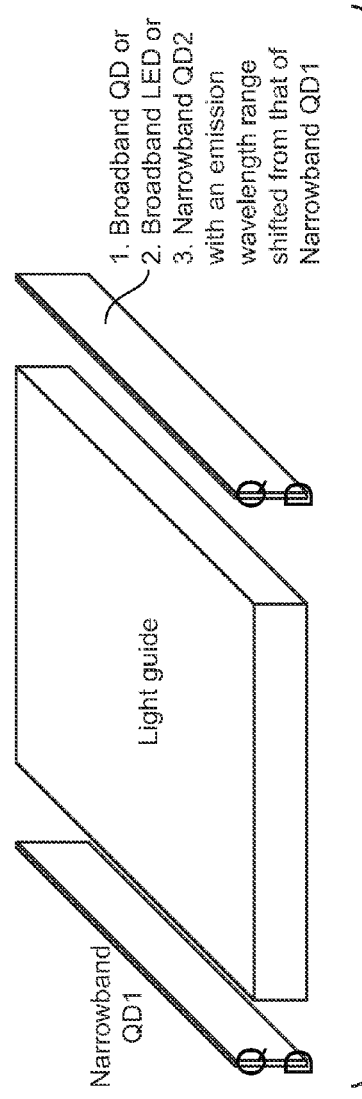
Figure 14C:
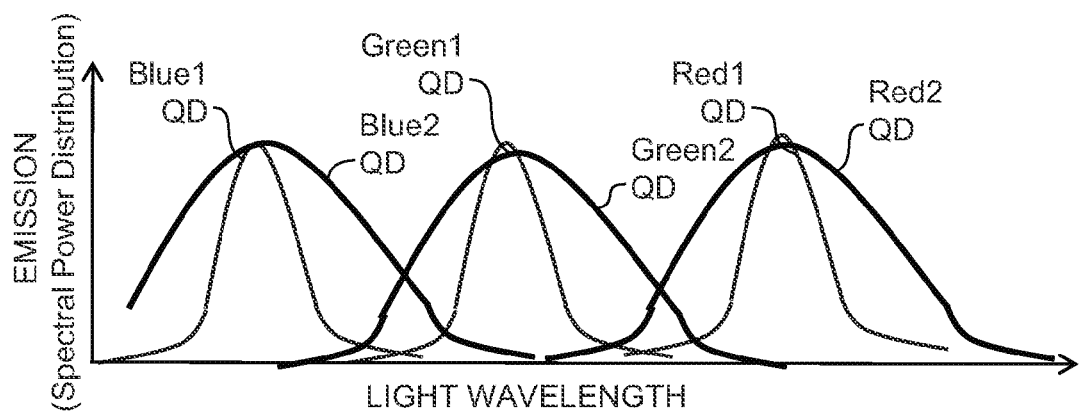

FIG. 13D illustrates an example configuration for side-lit quantum dot configuration for reducing metamerism mismatch or error, in accordance with some possible embodiments of the invention. FIG. 14C illustrates example emission spectrums of narrowband QDs and broadband QDs or LEDs, in accordance with some embodiments of the invention. In some embodiments, to mitigate metameric errors, the broadband QDs or LEDs may be configured to emit more (e.g., by irradiating more intensely with LEDs on the wide spectrum QDs or by emitting light from the broadband LEDs) for colors near the (pure) white point; while the narrowband QDs may be configured to emit more for relatively saturated colors further away from the (pure) white point.

For example, when narrowband color light (e.g., as emitted from narrowband QDs) is used to express colors instead of broadband color light (from any light source, Sun, LEDs, QDs with a broad spectral power distribution), different people may see different colors, especially when the colors to be expressed are not relatively saturated primary colors in a color gamut but rather mixed colors. To cure this problem, narrowband QDs and broadband QDs may be illuminated separately (or broadband LEDs may be used in place of, or in addition to, broadband QDs). A driving algorithm may be implemented based on frame-by-frame image data to increase the emission of narrowband QDs and decrease the emission of broadband QDs or LEDs in regions of relatively saturated primary colors (away from the white point) in a color gamut; and to decrease the emission of the narrowband QDs and increase the emission of the broadband QDs or LEDs in regions of relatively mixed colors (close to the white point) in the color gamut.

Figure 14D:
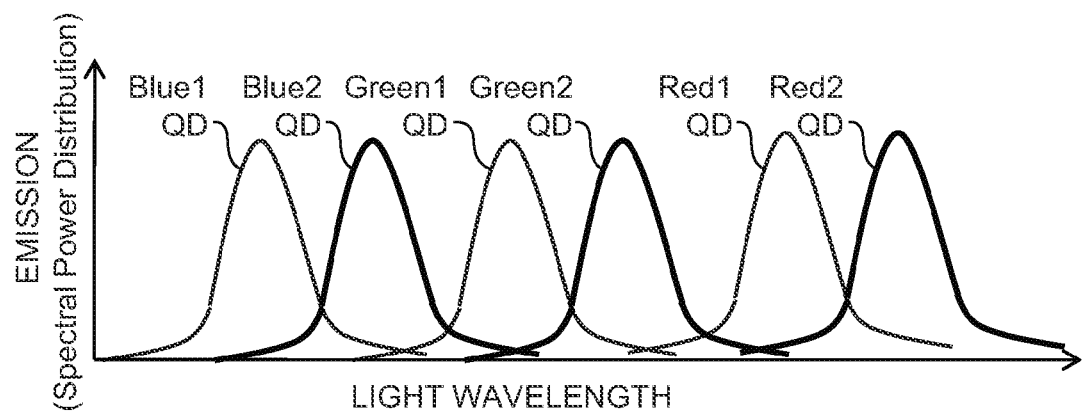

FIG. 14D illustrates example emission spectrums of two sets of narrowband QDs, in accordance with some embodiments of the invention. In some embodiments, to mitigate metameric errors, both sets of narrowband QDs may be configured to emit in relatively even proportions (40-60, 50-50 etc.) for colors near the (pure) white point; while only one set in the two sets of narrowband QDs may be configured to emit for relatively saturated colors further away from the (pure) white point. For saturated color regions of color spaces, one of the two sets of narrowband QDs may dominate (over 60%, 70%, 80% etc.) in the overall emission.

Figure 13E:
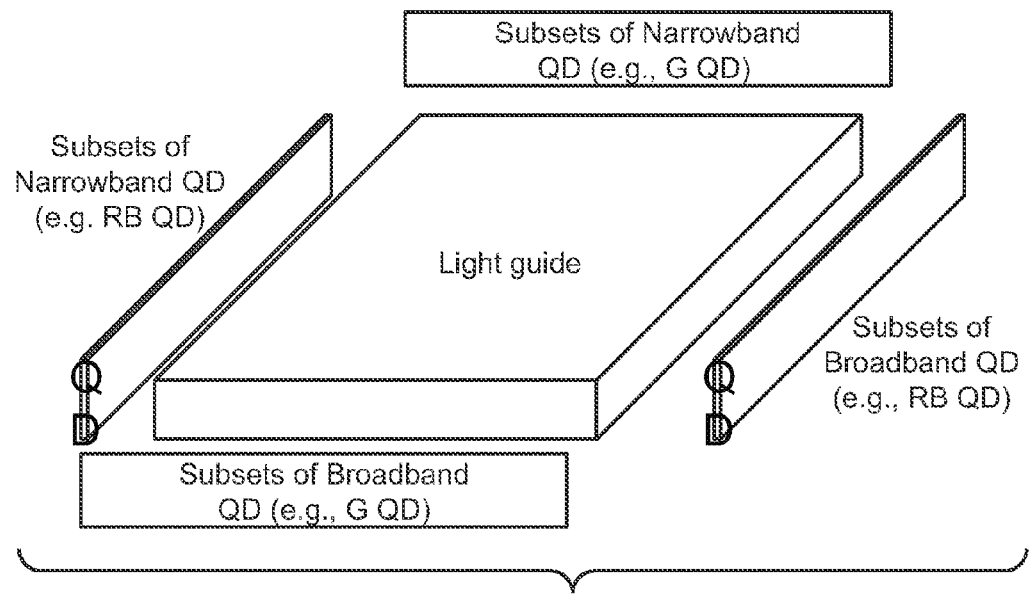

FIG. 13E illustrates another example configuration for side-lit quantum dot configuration for reducing metamerism mismatch or error, in accordance with some possible embodiments of the invention. As illustrated, separate sets of QD such as a set of narrowband QD and a set of broadband QD may be arranged in other configurations. For example, neither narrowband QD nor broadband QD has to emit all primary colors in a color gamut. One of more of subsets of narrow R, G, B, RB etc. QD may be used. Also, one or more of subsets of incomplete primary color broadband QD may be used. A set of narrowband QD may comprise two subsets of QDs, each of which subsets is located in different spatial location. Similarly, different subsets of broadband QD may be located in different spatial location.

Figure 13F:
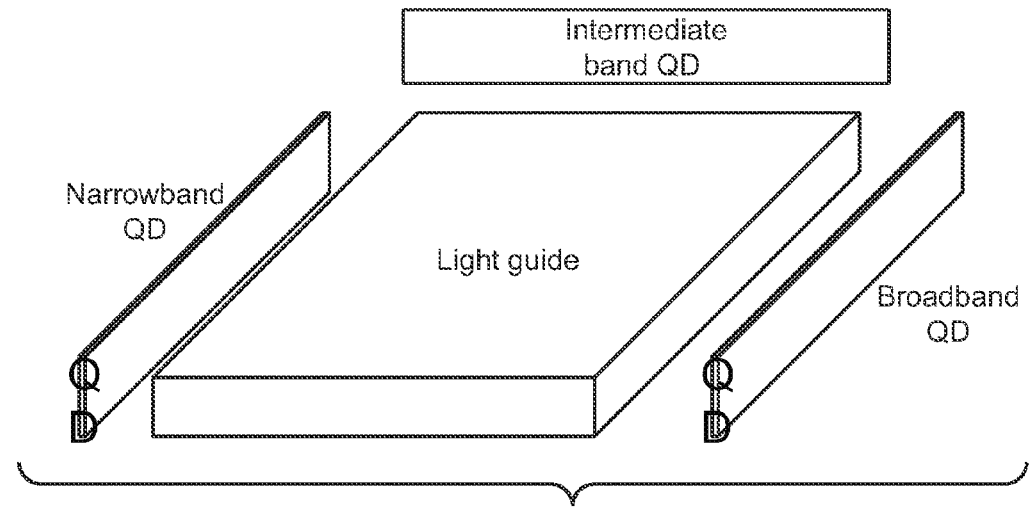

FIG. 13F illustrates another example configuration for side-lit quantum dot configuration for reducing metamerism mismatch or error, in accordance with some possible embodiments of the invention. As illustrated, in addition to narrowband QDs and broadband QDs, intermediate band QDs may also be used with the foregoing configurations.

Figure 15:
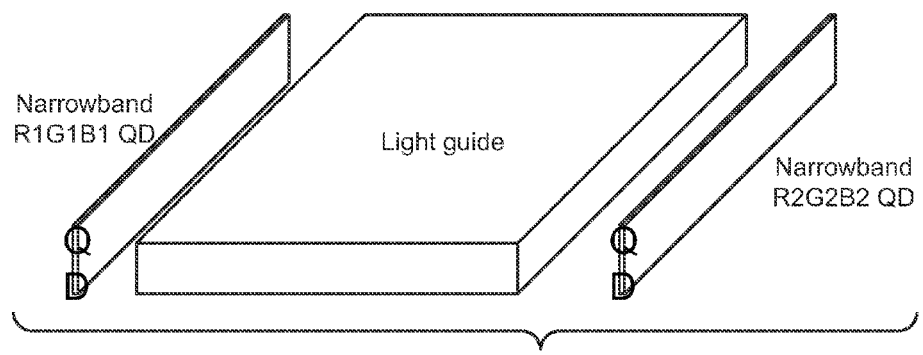
FIG. 15 illustrates another example configuration for side-lit quantum dot configuration for supporting 3D applications, in accordance with some possible embodiments of the invention.

FIG. 15 illustrates another example configuration for side-lit quantum dot configuration for supporting 3D applications, in accordance with some possible embodiments of the invention. As illustrated, two sets of narrowband QD may be used for 3D. The first set is used to illuminate a left view image frame, while the second set is used to illuminate a right view image frame. Frame sequential or field sequential techniques may be used to create 3D image frames.

A display device may use 2 sets of narrowband QDs concurrently to simulate a broadband wavelength spectrum that reduces metameric errors in 2D display applications. In 3D display applications, the display device may use 2 sets of narrowband QDs in a frame sequential manner to create left view and right view images sequentially. The left view and right view images may be viewed through passive glasses whose left perspective transmits only light wavelengths (e.g., R1G1B1) from left view images and whose right perspective transmits only light wavelengths (R2G2B2) from right view images.

In 2D applications, for colors that require broad spectrum, both sets of narrowband QD may be illuminated to achieve brightness as well as less metameric errors/failures. Based on where the color (e.g., a pure saturated primary color outside broad-spectrum colors) in a color gamut, a set of narrowband QDs may be selected to be illuminated.

To support 3D display applications, in some embodiments, a frame sequential display with different sets of primary colors allows use of passive glasses. Under techniques as described herein, dichroic LCDs and passive glasses may be used to support a frame sequential 3D scheme that avoids using costly active retarder based 3D display scheme. Under techniques as described herein, a frame sequential display with different sets of primary colors through different sets of narrowband QD allows making an inexpensive 3D system with passive glasses. The added advantage is that in non-3D mode the same QDs are used to avoid metameric failures.

Figure 16:
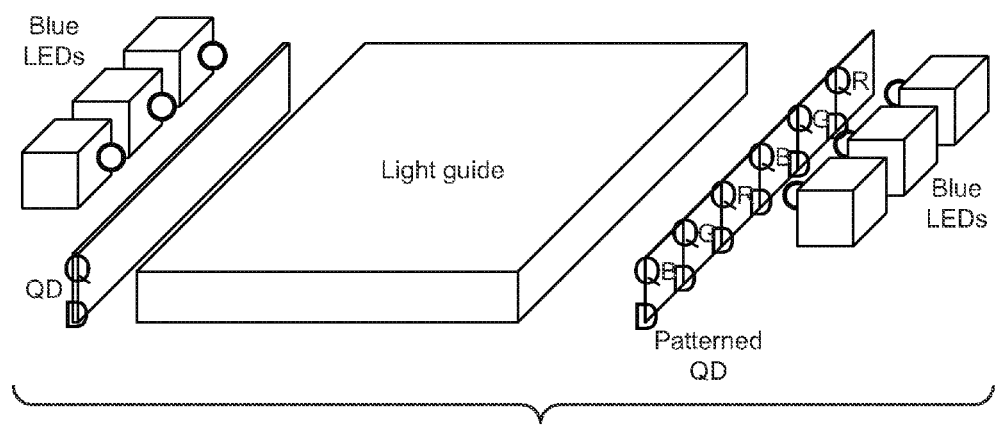
FIG. 16 illustrates an example configuration for controlling white points, in accordance with some possible embodiments of the invention.

FIG. 16 illustrates an example configuration for controlling white points, in accordance with some possible embodiments of the invention. As illustrated, side-lit patterned QD strips may be used to control white points. QD may be arranged in spatial patterns. Two or more of all primary colors in a display device may be in separate spatial areas (e.g. QD may be printed or disposed in different small strips with different light emitters designated to illuminate them). It should be noted that while some primary color QDs may be patterned, zero, one or more other primary color QDs may still be mixed. LED light may leak from one designated area to other neighboring areas, thereby creating cross coupling between different color areas. Algorithms may be used to adjust intensities of individual light emitters in order to compensate cross coupling between different areas on the patterned QD strip. Individual LEDs may be controlled based on which color QD each of them is designated to illuminate, in order to provide any white point (obtained from one time calculation, image frame specific calculation, or custom white point).

Figure 17:
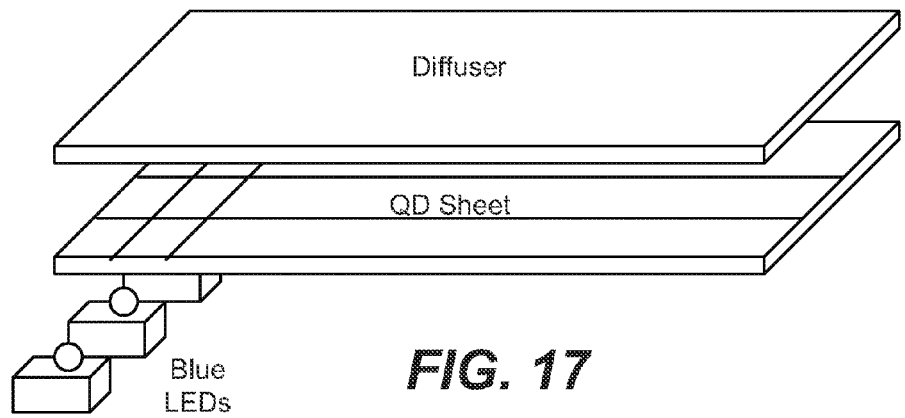
FIG. 17 illustrates an example direct-lit configuration, in accordance with some possible embodiments of the invention.
Figure 18:
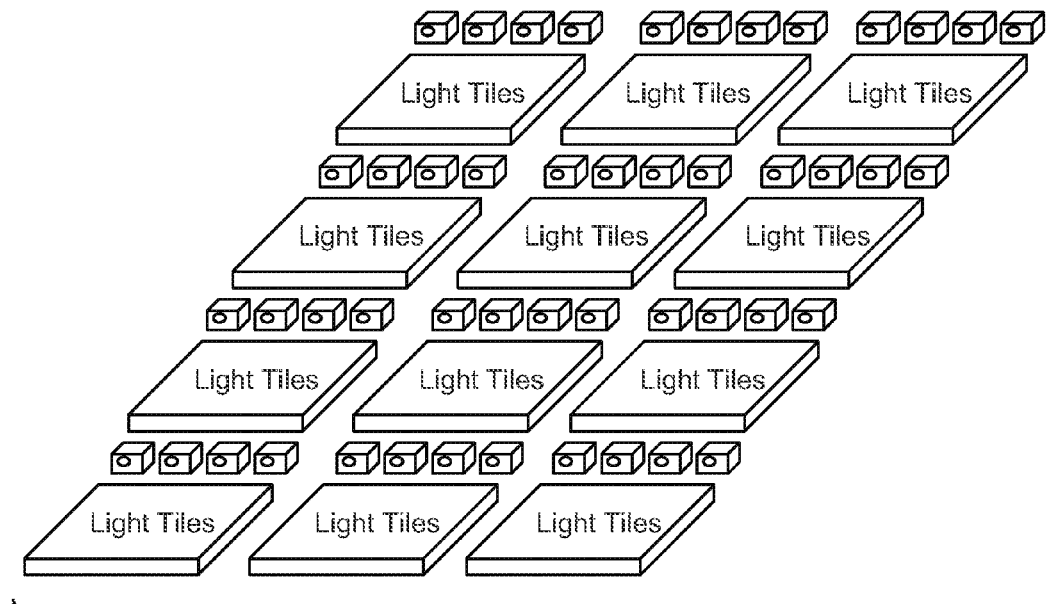
FIG. 18 illustrates an example tile QD configuration, in accordance with some possible embodiments of the invention.

FIG. 17 illustrates an example direct-lit configuration, in accordance with some possible embodiments of the invention. As illustrated, light emitters in the direct-lit (which may include backlight-lit) QD configuration may be driven in a similar manner to how light emitters may be driven in side-lit configurations. The quantum dots in this configuration may be disposed with a non-diffusive (e.g., transparent) sheet. FIG. 18 illustrates an example tile QD configuration, in accordance with some possible embodiments of the invention. All the embodiments as described herein in connection with light guides apply to the direct-lit configuration and the tile QD configuration.

As illustrated in FIG. 17 and FIG. 18, on a scale smaller than an entire light guide, for example, on each tile disposed with quantum dots, or each portion of a light guide disposed with quantum dots, there may be one or more blue LED's with one or more types of QDs. Emission may be controlled for each tile or each portion of the light guide individually or as a combination. 3D display application, multiple sets of primary colors, more than one set of primary color, metameric error mitigation, white point control, color control etc. as described previously may be provided per tile and/or per portion of a light guide. Quantum dots in these configurations may be in the front, back, interior etc. of the tile and/or the portion of the light guide.

FIG. 19 illustrates an example configuration in which a light guide comprises multiple disjoint parts, in accordance with some possible embodiments of the invention. As illustrated, the light guide may be broken apart into multiple strips rather than grouped as a single contiguous piece. Breaking up one or more light guides into smaller guides is a better solution to the 3D frame sync issue and for frame light up sync to avoid motion artifacts. Due to the fact that the frame does not update at one time, the correct 3D primary colors need to light up, for example, a right frame section without black insertion. By breaking up the light guides, light may be isolated per each section (e.g., as illuminated by each disjoint part of a light guide).

As illustrated in FIG. 20A, in 3D display applications, Frame 1 may be a right image of a 3D image, while Frame 2 may be a left image of the 3D image or of a different 3D image. In illuminating for Frame 1, if a light guide lights up to generate the right image in its entirety from Scan Line 1 through, for example, Scan Line 1920, the illumination from the light guide for the right image may overlap or interfere with the illumination from the light guide for the left image. Under other techniques, black insertion may be made between the right image as given by Frame 1 and the left image as given by Frame 2.

Under techniques herein, as illustrated in FIG. 20B, in 3D display applications, in illuminating for Frame 1, if different strips or different portions of a light guide lights up at different (e.g., successively) times for different portions of scan lines. For example, a light guide strip LG s1 of the light guide may light up to generate illumination for Scan Line 1 and Scan Line 2 at a first time, a light guide strip LG s2 of the light guide may light up to generate illumination for the next group of scan lines after Scan Line 1 and Scan Line 2 at a second time, ... and a light guide strip LG s4 of the light guide may light up to generate illumination for Scan Line 1919 and Scan Line 1920 at a later time after the second time. LG s1 through LG s4 may be individually turned on or off. Thus, for example, since LG s1 and LG s4 have very little overlap in time, for much of the time when LG s1 is turned on, LG s4 may be turned off; conversely, for much of the time when LG s4 is turned on, LG s1 may be turned off. As a result, light pollution between different groups of scan lines may be reduced or prevented.

What is claimed is:

1. A display system, comprising:
    a plurality of light source components that are configured to emit a first light; and
    a light converter configured to be illuminated by the first light to convert the first light into second light, the second light comprising a mixture of two or more primary color components, and to illuminate pixels in one or more light modulation layers with the mixture of two or more primary color components;
    wherein the mixture of two or more primary color components comprises light of a first primary color and light of one or more second primary colors;
    wherein the light of the first primary color in the second light is generated by a first type of light conversion materials in the light converter that convert a first portion of the first light emitted by a first set of light source components in the plurality of light source components;
    wherein the light of the one or more second primary colors in the second light is generated by one or more second types of light conversion materials in the light converter that convert one or more second portions of the first light emitted by a second set of light source components in the plurality of light source components;
    wherein the first type of light conversion materials in the light converter is separate in space from the one or more second types of light conversion materials in the light converter;
    wherein an intensity of the first portion of the first light emitted by the first set of light source components in the plurality of light source components to illuminate the first type of light conversion materials is controlled separately from intensities of the one or more second portions of the first light emitted by the second set of light source components in the plurality of light source components to illuminate the one or more second types of light conversion materials;
    wherein the light converter represents a layer separate from the one or more light modulation layers.

2. The display system of claim 1, wherein the plurality of light source components comprise light-emitting diodes.

3. The display system of claim 2, wherein the light-emitting diodes comprise single colored light-emitting diodes.

4. The display system of claim 1, wherein the display system is configured to direct the second light to illuminate one or more display panels.

5. The display system of claim 1, wherein the light converter comprises a pattern of spatially non-overlapping light conversion units and wherein each of the spatially non-overlapping light conversion units is configured to produce a part of a single primary color component in the two or more primary color components in the second light.

6. The display system of claim 1, wherein the display system is configured to illuminate a plurality of display panels with the second light regenerated from one or more light conversion materials in the light converter.

7. The display system of claim 1, further comprising a reflector disposed with one or more light conversion materials configured to regenerate at least a portion of the second light with at least a portion of the first light from the plurality of light source components.

8. The display system of claim 1, wherein the display system is configured to replace passive color filters with active color filters that comprise light conversion materials.

9. The display system of claim 1, wherein at least one of absolute intensity or relative intensity of color components in the second light is monitored and regulated.

10. The display system of claim 1, wherein the display system is configured to employ one or more pulse-width modulation (PWM) control signals to control relative and/or absolute intensities of at least one color component in the second light between a minimum intensity and a maximum intensity.

11. A method, comprising:
    emitting, from a plurality of light source components, first light; and
    illuminating a light converter by the first light to convert the first light by the light converter into second light, the second light comprising a mixture of two or more primary color components, and illuminate pixels in one or more light modulation layers with the mixture of two or more primary color components;
    wherein the mixture of two or more primary color components comprises light of a first primary color and light of one or more second primary colors;
    wherein the light of the first primary color in the second light is generated by a first type of light conversion materials in the light converter that convert a first portion of the first light emitted by a first set of light source components in the plurality of light source components;
    wherein the light of the one or more second primary colors in the second light is generated by one or more second types of light conversion materials in the light converter that convert one or more second portions of the first light emitted by a second set of light source components in the plurality of light source components;
    wherein the first type of light conversion materials in the light converter is separate in space from the one or more second types of light conversion materials in the light converter;
    wherein an intensity of the first portion of the first light emitted by the first set of light source components in the plurality of light source components to illuminate the first type of light conversion materials is controlled separately from intensities of the one or more second portions of the first light emitted by the second set of light source components in the plurality of light source components to illuminate the one or more second types of light conversion materials;

wherein the light converter represents a layer separate from the one or more light modulation layers.

12. The method of claim 11, wherein the plurality of light source components comprise light-emitting diodes.

13. The method of claim 12, wherein the light-emitting diodes comprise single colored light-emitting diodes.

14. The method of claim 11, further comprising directing the second light to illuminate one or more display panels.

15. The method of claim 11, wherein the light converter comprises a pattern of spatially non-overlapping light conversion units and wherein each of the spatially non-overlapping light conversion units is configured to produce a part of a single primary color component in the two or more primary color components in the second light.

16. The method of claim 11, further comprising illuminating a plurality of display panels with the second light regenerated from one or more light conversion materials in the light converter.

17. The method of claim 11, wherein the method is performed by a display system, and wherein the display system comprises a reflector disposed with one or more light conversion materials configured to regenerate at least a portion of the second light with at least a portion of the first light from the plurality of light source components.

18. The method of claim 11, wherein the method is performed by a display system, and wherein the display system is configured to replace passive color filters with active color filters that comprise light conversion materials.

19. The method of claim 11, wherein at least one of absolute intensity or relative intensity of color components in the second light is monitored and regulated.

20. The method of claim 11, wherein the method is performed by a display system, and wherein the display system is configured to employ one or more pulse-width modulation (PWM) control signals to control relative and/or absolute intensities of at least one color component in the second light between a minimum intensity and a maximum intensity.

* * * * *